US012752395B2

(12) United States Patent
Tan et al.

(10) Patent No.: US 12,752,395 B2
(45) Date of Patent: Oct. 6, 2026

(54) SHOT PEENING FLOW CONTROL VALVE AND ITS METHOD OF USE

(71) Applicant: ABRASIVE ENGINEERING PTE LTD, Singapore (SG)

(72) Inventors: Keng Huat Tan, Singapore (SG); Lester Dizon.O, Singapore (SG); Wei Shion Ngu, Singapore (SG); Sheevandra A\L P.Nadesar, Singapore (SG); Gavin Rajel Dias, Singapore (SG); Muhammad Shukri Bin Azmi Azrul, Singapore (SG); Yusong Meng, Singapore (SG); Yong Syn Nataniel Tham, Singapore (SG)

(73) Assignee: ABRASIVE ENGINEERING PTE LTD, Singapore (SG)

( * ) Notice: Subject to any disclaimer, the term of this patent is extended or adjusted under 35 U.S.C. 154(b) by 396 days.

(21) Appl. No.: 18/563,927

(22) PCT Filed: May 28, 2022

(86) PCT No.: PCT/SG2022/050364
§ 371 (c)(1),
(2) Date: Nov. 24, 2023

(87) PCT Pub. No.: WO2022/250619
PCT Pub. Date: Dec. 1, 2022

(65) Prior Publication Data

US 2024/0261936 A1 Aug. 8, 2024

(30) Foreign Application Priority Data

May 28, 2021 (CN) ........................ 202121170540.6

(51) Int. Cl.
*F16K 31/08* (2006.01)
*B24C 1/10* (2006.01)
(Continued)

(52) U.S. Cl.
CPC .............. *B24C 1/10* (2013.01); *F16K 31/082* (2013.01); *G05D 7/0605* (2013.01); *B24C 7/00* (2013.01)

(58) Field of Classification Search
CPC ........... B24C 1/10; B24C 7/00; F16K 31/082; G05D 7/0605
See application file for complete search history.

(56) References Cited

U.S. PATENT DOCUMENTS

| | | | | |
|---|---|---|---|---|
| 5,362,027 A | | 11/1994 | Champaigne et al. | |
| 5,654,496 A | * | 8/1997 | Thompson ................ | B24C 5/04 73/1.01 |

(Continued)

OTHER PUBLICATIONS

International Search Report and Written Opinion of the corresponding PCT application No. PCT/SG2022/050364 mailed on Jan. 31, 2023.

*Primary Examiner* — John Bastianelli
(74) *Attorney, Agent, or Firm* — IDEA Intellectual Limited; Sam T. Yip

(57) ABSTRACT

Present disclosure describes a shot peening flow control valve for regulating flow of ferromagnetic media. The shot peening flow control valve comprising a body enclosing a passage for transferring the ferromagnetic media from a first end of the passage to a second end of the passage and at least one core set arranged between the first end and the second end. The at least one core set comprises at least one magnetic unit, and the at least one magnetic unit is operable to provide a magnetic field at the passage. The at least one magnetic unit may project or provide the magnetic field at the passage in order to regulate, control, or stop the flow of ferromagnetic media. Thus, the shot peening flow control valve facilitates effective control of the ferromagnetic media during the shot peeing process.

22 Claims, 18 Drawing Sheets

(51) Int. Cl.
*G05D 7/06* (2006.01)
*B24C 7/00* (2006.01)

(56) References Cited

U.S. PATENT DOCUMENTS

| | | | | |
|---|---|---|---|---|
| 9,126,305 | B2 * | 9/2015 | Champaigne | B24C 7/00 |
| 2014/0373585 | A1 * | 12/2014 | Ache | C21D 7/06<br>72/53 |
| 2019/0337121 | A1 | 11/2019 | Cheng et al. | |
| 2020/0400469 | A1 * | 12/2020 | Champaigne | F16K 31/082 |
| 2021/0046611 | A1 | 2/2021 | Ho et al. | |

* cited by examiner

SHOT PEENING FLOW CONTROL VALVE AND ITS METHOD OF USE

The present application claims a filing date of an earlier Utility Model application number 2021 2 1170540.6 as its priority date, which was submitted to China National Intellectual Property Administration Organization (CNIPA) on 28 May 2021. The Utility Model was published as CN215214973U. All contents or relevant subject matter of the priority application is hereby incorporated entirely and/or wherever appropriate by reference.

The present disclosure relates to a shot peening flow control valve that can be used in shot peening equipment or a shot blasting machine.

In most applications, metal is cast or forged into the desired shape after it is made malleable through the application of heat. A cold working process is used to treat the surface of metal parts to prevent fatigue and stress corrosion damage from occurring, thereby extending the product life of the metal part. Subjecting the metal to this mechanical stress causes a permanent change to the metal's crystalline structure, causing an increase in strength.

Shot peening is a cold work process used to impart compressive residual stresses on to the surface of a component, which results in modified mechanical properties. The shot peening process is used to add strength and reduce the stress profile of components.

Shot peening uses small balls of accelerated motion to blast the surface of a metal part to achieve a surface finish. The balls act like a round-headed hammer, punching nests in the surface and creating compressive stresses beneath multiple overlapping nests. The continuous impact of the pellets on the metal part creates multiple overlapping recesses throughout the treated surface.

The surface compressive stress strengthens the metal part, ensuring that the surface treated metal part is resistant to fatigue, corrosion, cracking, abrasion and surface cavitation erosion. Commonly used medium (i.e., media) or media (i.e., medium) include steel beads, ceramic beads and glass beads. Shot peening is a cost-effective method of extending the life of metal parts by creating residual compressive stresses on the surface.

Shot peening is also used to harden metal parts to improve their wear resistance characteristics, correct deformation, and achieve surface structural optimization. Treated metal parts can achieve high wear and fatigue resistance with a lighter weight structure. However, to ensure accuracy, reliability and repeatability the flow of media (i.e., medium) used for shot peening process have to be carefully controlled.

For the aforementioned reasons, there exist a need in the art to provide a control valve and a method of regulating the flow of media for enhancing properties of the metal parts, reducing operating costs, and improving the reliability of shot peening process.

The present disclosure overcomes one or more shortcomings of the prior art and provides additional advantages discussed throughout the present disclosure. Other aspects and aspects of the disclosure are described in detail herein and are considered a part of the claimed disclosure.

In one non-limiting aspect of the present disclosure, a shot peening flow control valve for regulating flow of ferromagnetic medium is disclosed. The ferromagnetic medium includes a shot medium or shot medium. The shot peening flow control valve comprising a body enclosing a passage for transferring the ferromagnetic medium from a first end of the passage to a second end of the passage, and at least one core set arranged between the first end and the second end. The at least one core set comprises at least one magnetic unit, and the at least one magnetic unit is operable to provide a magnetic field at the passage.

The passage may be internal to a shot peening machine or a shot blasting machine. The passage may be a blast tunnel, a channel or a tube. The first end of the passage may be an inlet or entrance of the shot peening flow control valve and the second end of the passage may be an outlet or exit of the shot peening flow control valve. The at least one core set may be arranged within the passage or within the proximity of the passage. The at least one magnetic unit of the at least one core set may project or provide the magnetic field at the passage in order to regulate, control, or stop the flow of ferromagnetic medium. Thus, the shot peening flow control valve facilitates effective control of the ferromagnetic medium during the shot peeing process.

In another non-limiting aspect of the present disclosure, the at least one core set comprises a housing for enclosing the at least one magnetic unit. The housing comprises a core set top for shielding the at least one magnetic unit from the ferromagnetic medium coming from the first end to the second end and a first core set side covering and a second core set side covering disposed at opposite sides of the at least one magnetic unit respectively, at least one of the first core set side covering and the second core set side covering being disposed at a pole of the at least one magnetic unit for shielding the pole and providing magnetic field of the pole at the passage. The first core set side covering and the second core set side covering may be a plate.

In yet another non-limiting aspect of the present disclosure, the at least one core set is disposed in a middle position of the passage in dividing the passage into a first passage and a second passage. The at least one core set is positioned in a center or central location, or between opposite sides of the passage for transferring the ferromagnetic medium near opposite poles of the at least one magnetic unit.

In yet another non-limiting aspect of the present disclosure, the at least one magnetic unit comprises a permanent magnet and a first electromagnet. The permanent magnet is operable to generate a magnetic field at the passage in order to arrest the flow of ferromagnetic medium independently when required, in the absence of activation of the electromagnets. A core of the first electromagnet is connected to a first end of the permanent magnet. The core of the first electromagnet is operable to offset or strengthen the magnetic field of the permanent magnet.

In yet another non-limiting aspect of the present disclosure, the at least one magnetic unit further comprises a second electromagnet, and a core of the second electromagnet is connected to a second end of the permanent magnet. The core of the second electromagnet is operable to offset or strengthen the magnetic field of the permanent magnet.

The cores of the first and second electromagnets are aligned with the permanent magnet such that each of the first electromagnet, the permanent magnet and the second electromagnet is able to form their individual magnetic field, or in combination.

In yet another non-limiting aspect of the present disclosure, the magnetic unit further comprises a control unit connected to any of the first and second electromagnets in order to regulate magnetic fields of the first and second electromagnets. The regulation of the magnetic field comprises canceling the magnetic at the passage in order to release the flow of ferromagnetic medium.

In yet another non-limiting aspect of the present disclosure, a portion of the at least one core set comprises a magnetic field conductor material (also known as ferrous material or material with low flux resistance) for conducting magnetic fields around the at least one core set. The portion may be a component of the at least one core set that conducts the magnetic field around the permanent magnet, the first electromagnet, the second electromagnet.

In yet another non-limiting aspect of the present disclosure, the at least one core set comprises a first core set and a second core set that are spaced apart, the first core set and a second core set being operable to work together. The first core set and the second core set may be aligned in series or parallel may work in coordination, such as sequentially or simultaneously.

In yet another non-limiting aspect of the present disclosure, the first core set and the second core set are serially positioned from each other such that the first core set and the second core set are at different distance from the first end or second end or both ends.

In yet another non-limiting aspect of the present disclosure, the first core set and the second core set are positioned in parallel such that the first core set and the second core set are at substantially the same distance from the first end or second end or both ends.

In yet another non-limiting aspect of the present disclosure, the shot peening flow control valve further comprises a third core set that is positioned serially with the first core set and the second core set such that the third core set is substantially at different distance from the first end or second end or both ends, with respect to any of the first core set and/or the second core set.

In yet another non-limiting aspect of the present disclosure, a shot peening flow control valve for regulating a flow of ferromagnetic medium. The shot peening flow control valve comprising a body defining a passage for transferring the ferromagnetic medium from a first end of the passage to a second end of the passage, at least one core layer arranged between the first end and the second end comprising at least one core line, wherein the at least one core layer is operable to provide a magnetic field at the passage; and a cover enclosing the at least one core layer. The cover comprises an inlet flange for transferring the ferromagnetic medium from the first end a first side frame and a second side frame disposed at opposite sides of the at least one core layer, respectively, a first central frame and a second central frame disposed at a front end and a rear end of the at least one core layer, and a base diversion block disposed below the at least one core layer, the first and the second side frames, and the first and the second central frames of the cover. The base diversion block may act as a flow sensor fixture.

The passage may be internal to a shot peening machine or a shot blasting machine. The passage may be a blast tunnel, a channel or a tube. The first end of the passage may be an inlet or entrance of the shot peening flow control valve and the second end of the passage may be an outlet or exit of the shot peening flow control valve.

The at least one core layer is arranged within the passage or within the proximity of the passage such that the at least one core layer divides the passage between the inlet and the outlet into a plurality of passages. The at least one core layer may project or provide the magnetic field at the passage in order to regulate, control, or stop the flow of ferromagnetic medium. Thus, the shot peening flow control valve facilitates effective control of the ferromagnetic medium during the shot peeing process.

In yet another non-limiting aspect of the present disclosure, the at least one core line comprises a plurality of core sets connected in with each other, each one of the core sets being separated from another core set by a core set splitter, and a plurality of shaft for connecting the plurality of core sets and the core set splitters together. The plurality of shafts may be used to connect the at least one core line of the at least one core layer to the first central frame and the second central frame at the front and rear end respectively such that that ferromagnetic medium does not pass through them from the front end and the rear end.

In yet another non-limiting aspect of the present disclosure, the shot peening flow control valve further comprises a central extension guide for connecting one core line with another core line in parallel configuration. The central extension guide comprises a couple of triangular protrusions on both sided for at least one of the plurality of the core sets located on either side of the central extension guide. The couple of triangular protrusions are pointing towards a single slot, and the central extension guide divides a passage between the two core lines into two sub-passages. The couple of triangular protrusions are pointing towards the single slot in order to restrict the flow of ferromagnetic medium through the slot.

In yet another non-limiting aspect of the present disclosure, the shot peening flow control valve further comprises a first side extension guide and a second side extension guide disposed at opposite sides of the at least one core layer respectively. The first side extension guide and the second side extension guide comprise a couple of triangular protrusions on inner surface for at least one of the plurality of the core sets, the first side extension guide and the second side extension guide form a first outer passage and a second outer passage with the first side frame and the second side frame respectively, and the couple of triangular protrusions are pointing towards each other such that the flow of ferromagnetic medium is directed through the first outer passage and the second outer passage.

In yet another non-limiting aspect of the present disclosure, at least one of the plurality of core sets comprises a magnetic unit operable to provide the magnetic field at the passage, a housing for enclosing the magnetic unit. The housing comprising a core set top for shielding the magnetic unit from the ferromagnetic medium coming from the first end, a first core set side covering and a second core set side covering disposed at opposite sides of the magnetic unit respectively. The at least one of the first core set side covering and the second core set side covering is disposed at a pole of the magnetic unit for shielding the pole and providing magnetic field of the pole at the passage. The first core set side covering and the second core set side covering may be a plate.

In yet another non-limiting aspect of the present disclosure, the magnetic unit comprises a permanent magnet and a first electromagnet, and a core of the first electromagnet is connected to a first end of the permanent magnet. The permanent magnet is operable to generate a magnetic field at the passage in order to arrest the flow of ferromagnetic medium independently when required, in the absence of activation of the electromagnets.

A core of the first electromagnet is connected to a first end of the permanent magnet. The core of the first electromagnet is operable to offset or strengthen a magnetic field of the permanent magnet.

In yet another non-limiting aspect of the present disclosure, the magnetic unit further comprises a second electromagnet, and a core of the second electromagnet is connected to a second end of the permanent magnet. The core of the second electromagnet is operable to offset or strengthen the magnetic field of the permanent magnet.

The cores of the first and second electromagnets are aligned with the permanent magnet such that each of the first electromagnet, the permanent magnet and the second electromagnet is able to form their individual magnetic field, or in combination.

In yet another non-limiting aspect of the present disclosure, the shot peening flow control valve further comprises a central control unit, and a plurality of control units electrically connected with the central control unit. A control unit is connected to any of the first and second electromagnets of the respective magnetic in order to regulate magnetic fields of the first and second electromagnets. The plurality of control units may be controlled through the central control unit. The regulation of the magnetic field comprises canceling the magnetic at the passage in order to release the flow of ferromagnetic medium.

In yet another non-limiting aspect of the present disclosure, a shot peening machine for projecting ferromagnetic medium on a surface of at least one component is disclosed. The shot peening machine comprising a chamber for storing the ferromagnetic medium, a passage for transferring the ferromagnetic medium onto the surface of at least one component, a shot peening flow control valve comprising a body enclosing the passage for transferring the ferromagnetic medium from a first end of the passage to a second end of the passage. The at least one component is placed at the second end of the passage. The shot peening machine further comprises at least one core set arranged between the first end and the second end, the at least one core set comprising at least one magnetic unit, and the at least one magnetic unit is operable to provide a magnetic field at the passage and regulate a projection velocity of ferromagnetic medium on the surface of at least one component.

The passage may be internal to the shot peening machine or a shot blasting machine. The passage may be a blast tunnel, a channel or a tube. The first end of the passage may be an inlet or entrance of the shot peening flow control valve and the second end of the passage may be an outlet or exit of the shot peening flow control valve. The at least one core set may be arranged within the passage or within the proximity of the passage. The at least one magnetic unit of the at least one core set may automatically project or provide the magnetic field at the passage in order to regulate, control, or stop the flow of ferromagnetic medium. Thus, the shot peening flow control valve of the shot peening machine or the shot blasting machine facilitates effective control of the ferromagnetic medium during the shot peeing process.

In yet another non-limiting aspect of the present disclosure, the at least one magnetic unit comprises a permanent magnet and a first electromagnet, and a core of the first electromagnet is connected to a first end of the permanent magnet.

In yet another non-limiting aspect of the present disclosure, the at least one magnetic unit further comprises a second electromagnet, and a core of the second electromagnet is connected to a second end of the permanent magnet.

In yet another non-limiting aspect of the present disclosure, the magnetic unit further comprises a control unit connected to any of the first and second electromagnets in order to regulate magnetic fields of the first and second electromagnets.

In yet another non-limiting aspect of the present disclosure, the at least one core set comprises a first core set and a second core set that are spaced apart, the first core set and a second core set being operable to work together.

In yet another non-limiting aspect of the present disclosure, a method of regulating a flow of ferromagnetic medium is disclosed. The method comprises providing a magnetic field at a passage, transferring the ferromagnetic medium from a first end of the passage to a second end of the passage, and providing a magnetic field at the passage for controlling flow of ferromagnetic medium between the first end and the second end.

In yet another non-limiting aspect of the present disclosure, the providing of the magnetic field at the passage comprises generating a magnetic field by a permanent magnet of the at least one magnetic unit, a magnetic field at the passage or arresting the ferromagnetic medium by the magnetic field of the permanent magnet.

In yet another non-limiting aspect of the present disclosure, the provision of the magnetic field comprises regulating magnetic fields of a first electromagnet and/or a second electromagnet.

In yet another non-limiting aspect of the present disclosure, the method further comprises detecting magnetic field strength of the magnetic field by a magnetometer.

In yet another non-limiting aspect of the present disclosure, the method further comprises measuring, by a flowmeter, a flow rate of ferromagnetic medium. The flowmeter may be medium sensor. The measured flow rate of the ferromagnetic medium is used as a closed loop control shot peening flow control valve, having feedback control scheme.

Thus, the above mentioned shot peeing control valves, shot peening machine, and the method of regulating flow of ferromagnetic medium facilitate effective control of the ferromagnetic medium in the passage during the shot peeing process, thereby enhancing properties of the metal parts, reducing operating costs, and improving the reliability of shot peening process.

The foregoing summary is illustrative only and is not intended to be in any way limiting. In addition to the illustrative aspects, and features described above, further aspects, and features will become apparent by reference to the drawings and the following detailed description.

The accompanying drawings, which are incorporated in and constitute a part of this disclosure, illustrate exemplary aspects and, together with the description, serve to explain the disclosed principles. Some aspects of system and/or methods in accordance with aspects of the present subject matter are now described, by way of example only, and with reference to the accompanying Figures, in which.

Figure 13:
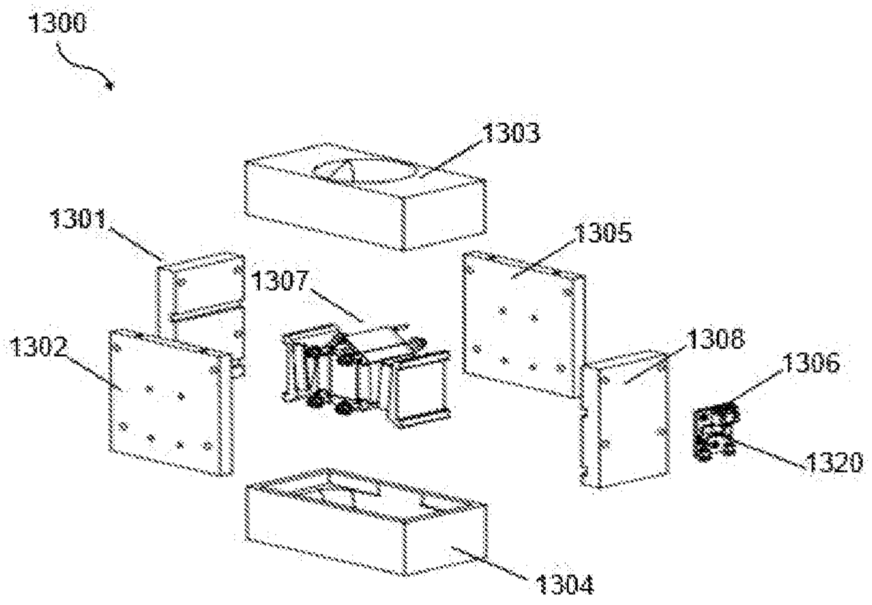
Figure 14:
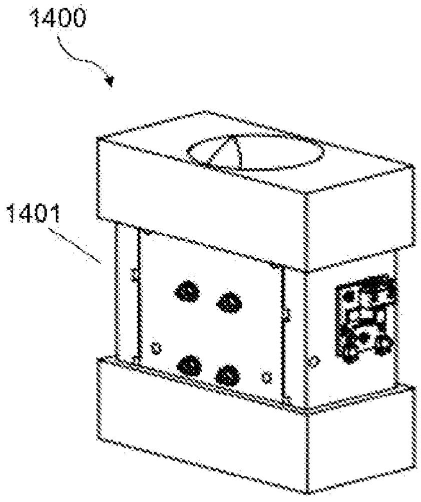
Figure 15:
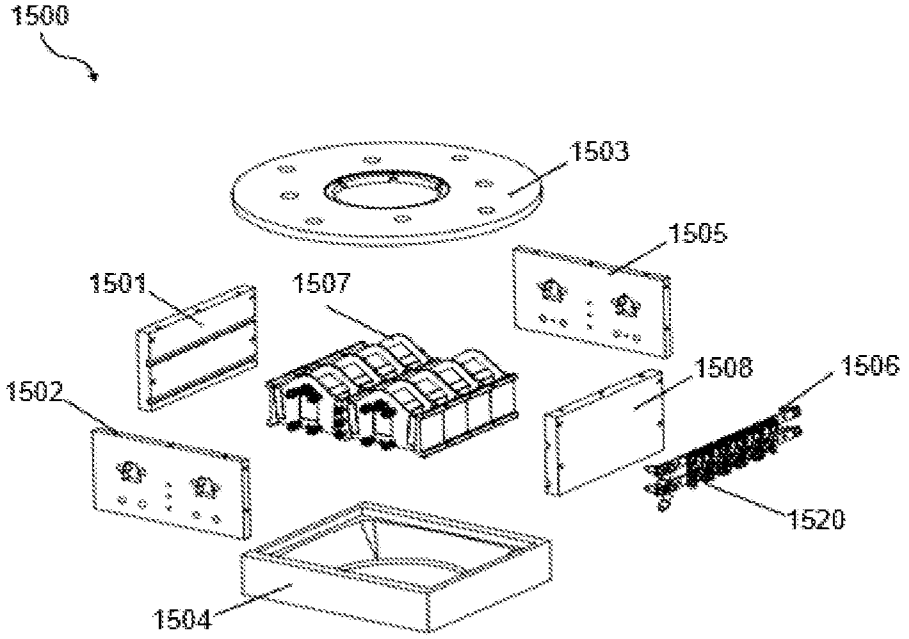
Figure 16:
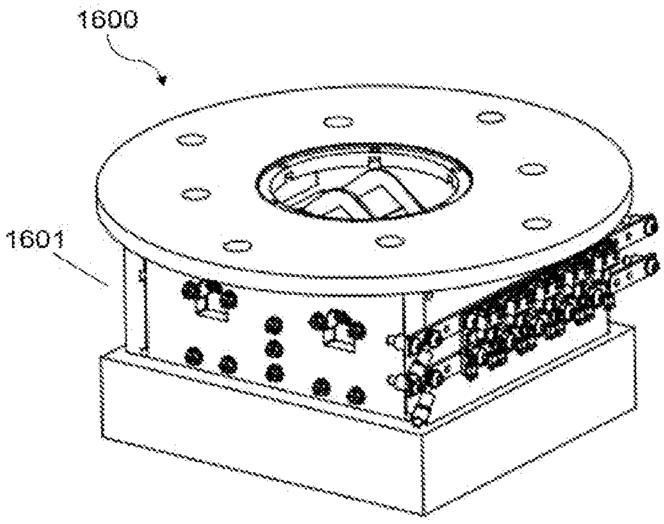
Figure 17:
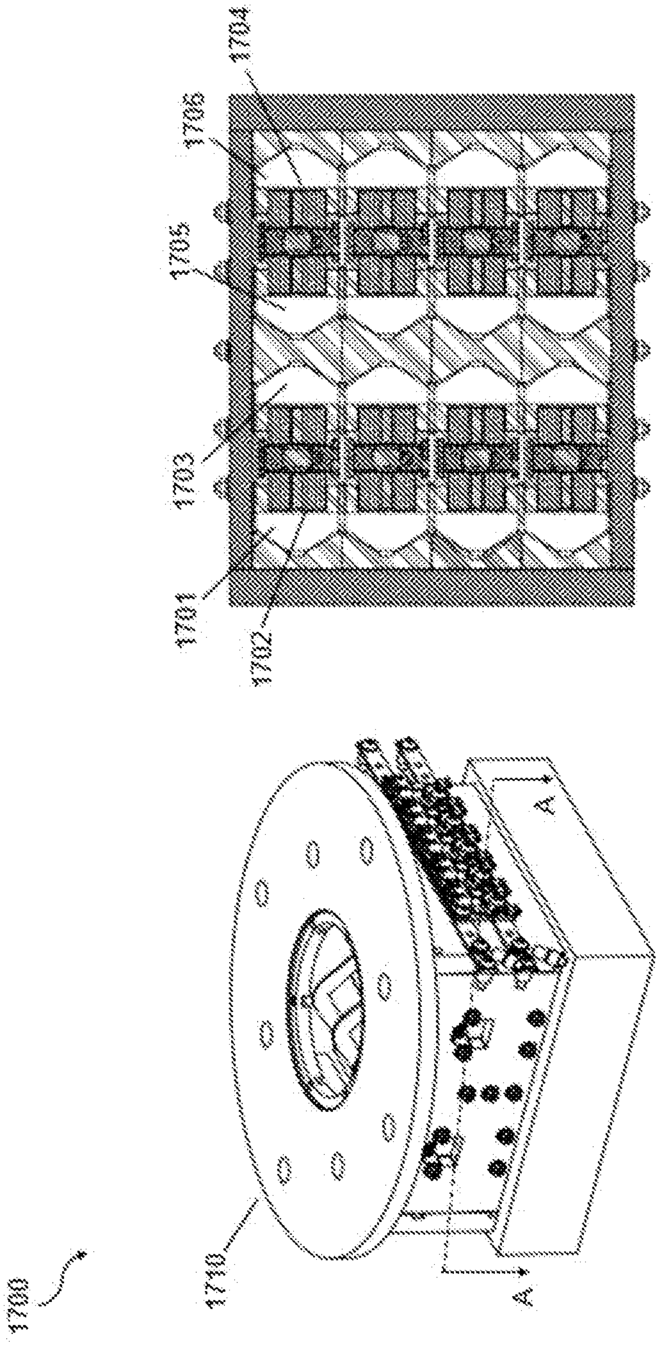
Figure 18:
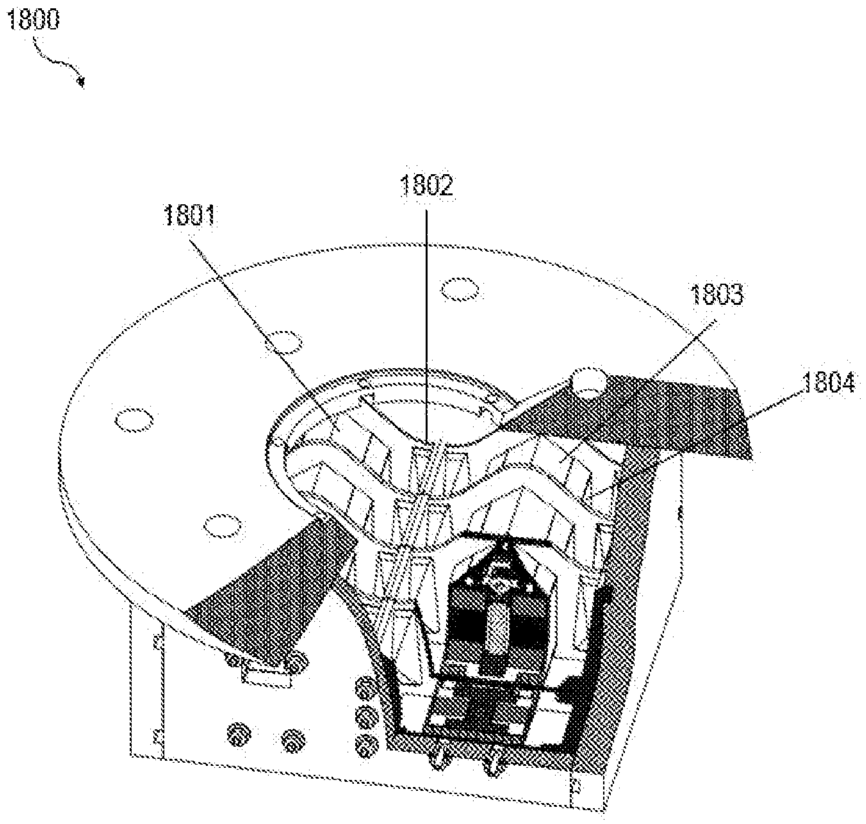
Figure 19:
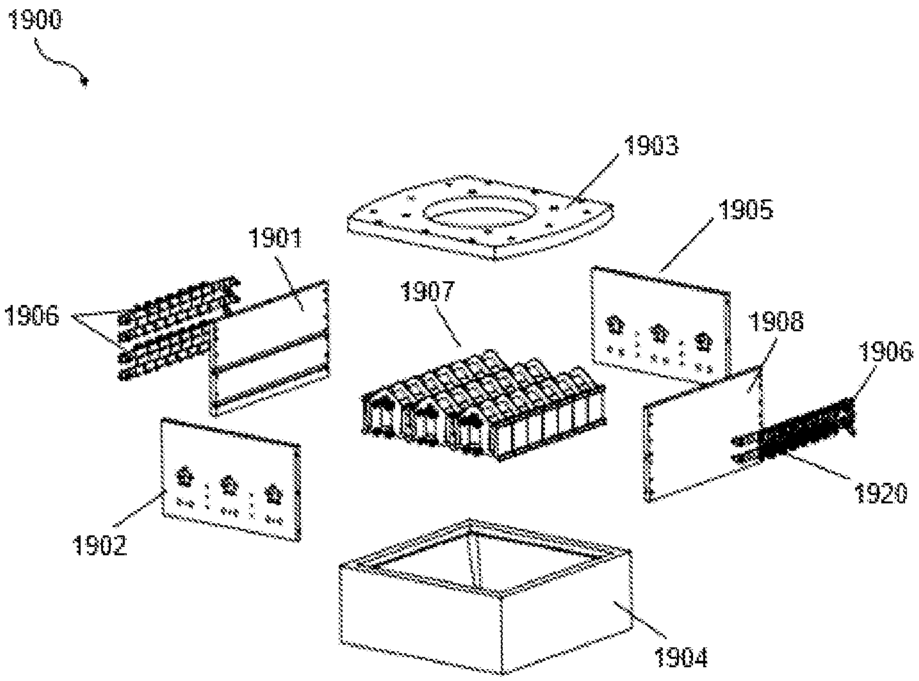
Figure 20:
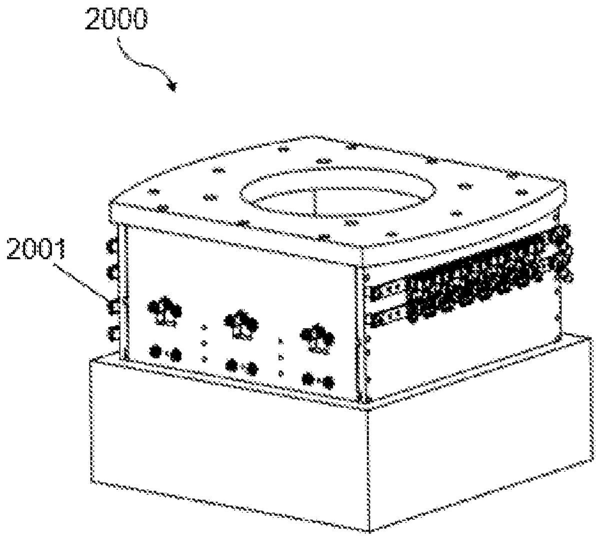
Figure 21:
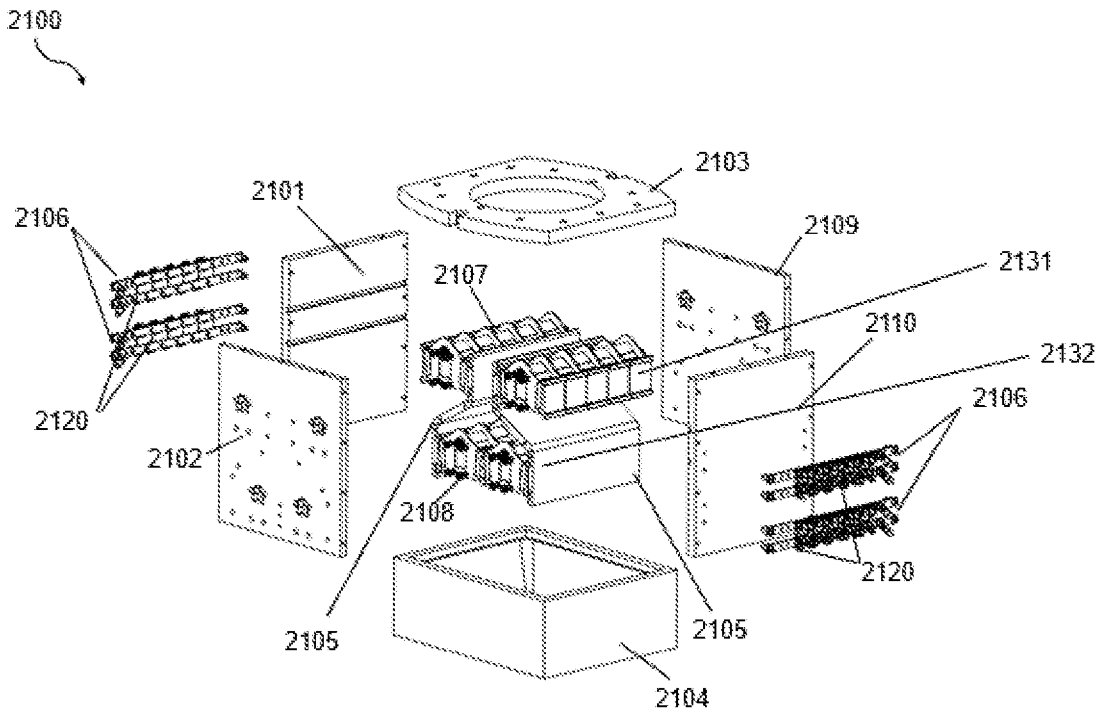
Figure 22:
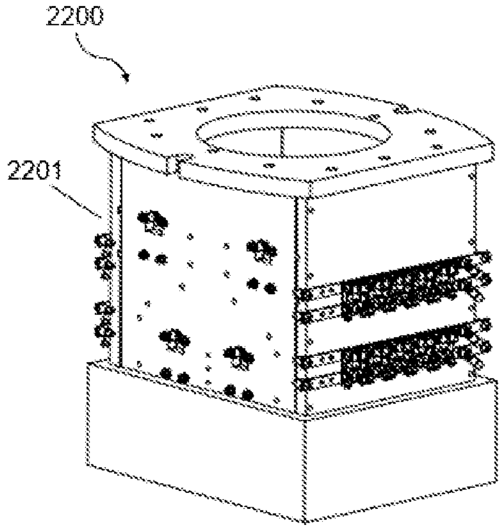
Figure 23:
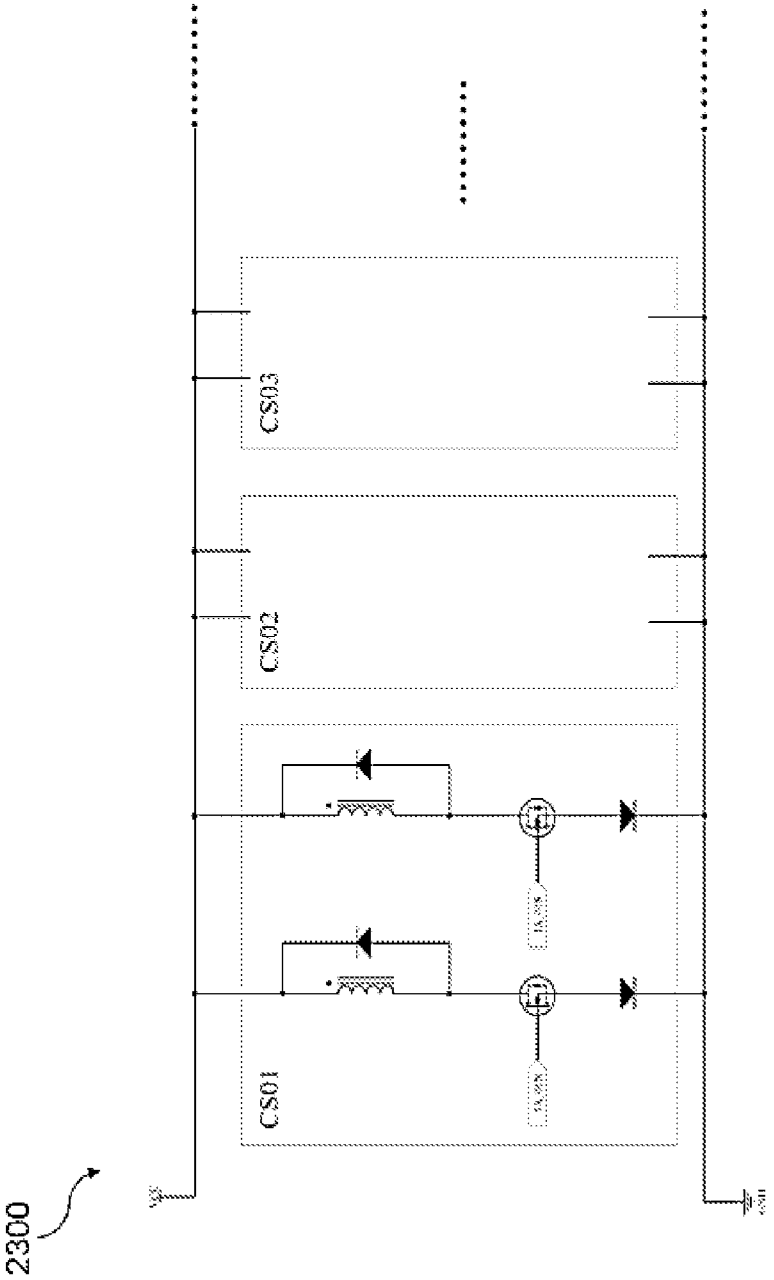
Figure 24:
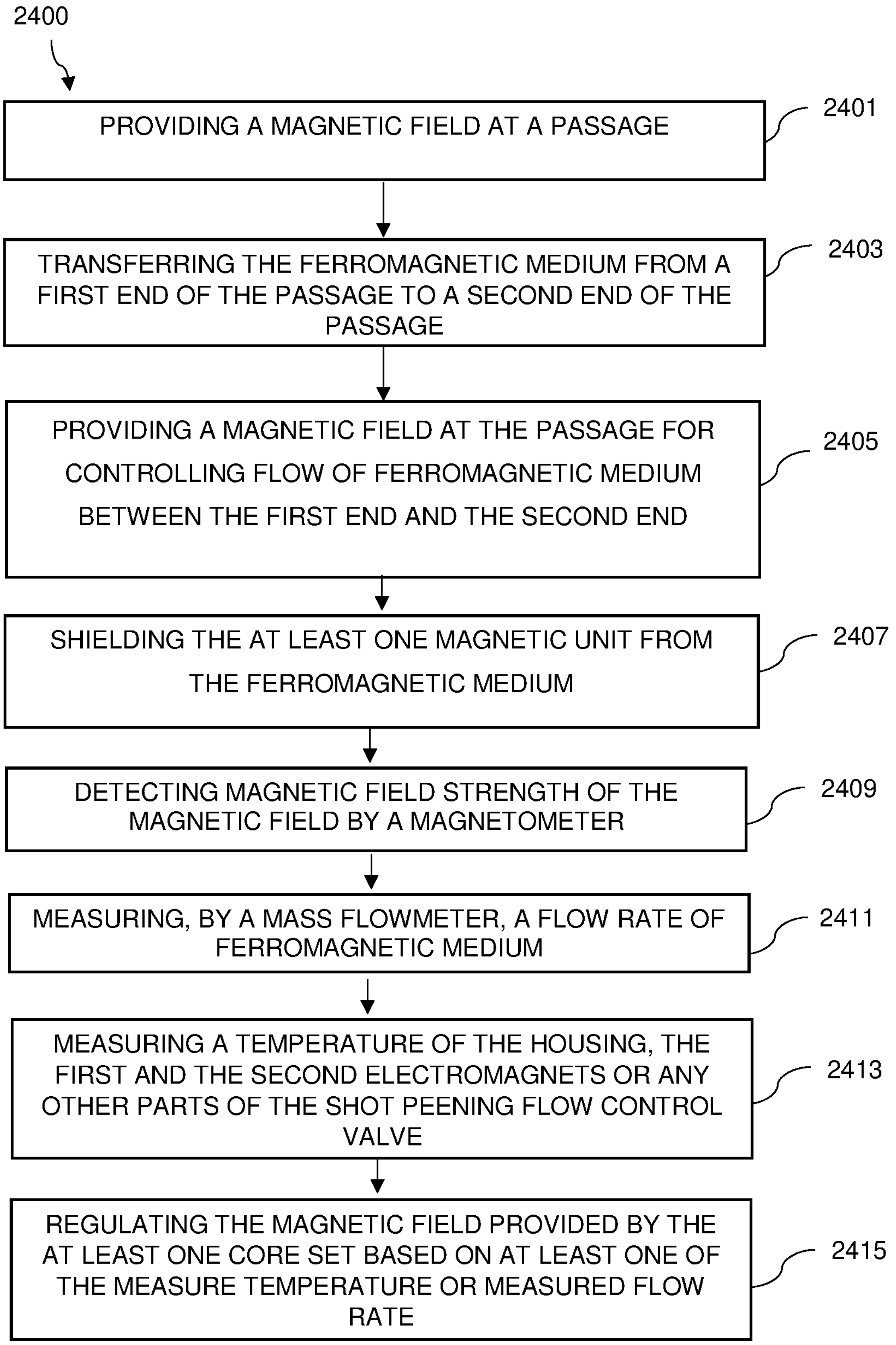

FIG. 13 an exploded view of single core set shot peening flow control valve, in accordance with some aspects of the present disclosure;

FIG. 14 an assembled view of single core set shot peening flow control valve, in accordance with some aspects of the present disclosure;

FIG. 15 depicts an exploded view of single layer dual core line shot peening flow control valve, in accordance with some aspects of the present disclosure;

FIG. 16 depicts an assembled view of single layer dual core line shot peening flow control valve, in accordance with some aspects of the present disclosure;

FIG. 17 depicts a cross-sectional view of a shot peening flow control valve along the dashed line A-A, in accordance with some aspects of the present disclosure;

FIG. 18 depicts a perspective view of a shot peening flow control valve, in accordance with some aspects of the present disclosure;

FIG. 19 an exploded view of single layer multiple core lines shot peening flow control valve, in accordance with some aspects of the present disclosure;

FIG. 20 depicts an assembled view of single layer multiple core lines shot peening flow control valve, in accordance with some aspects of the present disclosure;

FIG. 21 depicts an exploded view of multi-layer shot peening flow control valve, in accordance with some aspects of the present disclosure;

FIG. 22 depicts an assembled view of multi-layer shot peening flow control valve, in accordance with some aspects of the present disclosure;

FIG. 23 depict a control unit setup schematic diagram, in accordance with some aspects of the present disclosure;

FIG. 24 depicts a flowchart of a method of regulating flow of ferromagnetic media, in accordance with some aspects of the present disclosure;

It should be appreciated by those skilled in the art that any block diagrams herein represent conceptual views of the illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

In the present document, the word "exemplary" is used herein to mean "serving as an example, instance, or illustration." Any aspect or implementation of the present subject matter described herein as "exemplary" is not necessarily to be construed as preferred or advantageous over other aspects.

While the disclosure is susceptible to various modifications and alternative forms, specific aspects thereof have been shown by way of example in the drawings and will be described in detail below. It should be understood, however, that these aspects are not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

The expressions like "at least one" and "one or more" may be used interchangeably or in combination throughout the description.

In the following detailed description of the aspects of the disclosure, reference is made to the accompanying drawings that form a part hereof, and in which are shown by way of illustration of specific aspects in which the disclosure may be practiced. These aspects are described in sufficient detail to enable those skilled in the art to practice the disclosure, and it is to be understood that other aspects may be utilized and that changes may be made without departing from the scope of the present disclosure. The following description is, therefore, not to be taken in a limiting sense. In the following description, well known functions or constructions are not described in detail since they would obscure the description with unnecessary detail.

Present disclosure describes a shot peening flow control valve for regulating a flow of ferromagnetic media. The ferromagnetic media includes a shot medium or shot media. The shot peening flow control valve comprising a body enclosing a passage for transferring the ferromagnetic media from a first end of the passage to a second end of the passage, and at least one core set arranged between the first end and the second end. The at least one core set comprises at least one magnetic unit, and the at least one magnetic unit is operable to provide a magnetic field at the passage.

Accordingly, the shot peening flow control valve of the present disclosure facilitates an efficient control of the flow of ferromagnetic media for enhancing properties of the metal parts, reducing operating costs, and improving the reliability of shot peening process.

Figure 1:
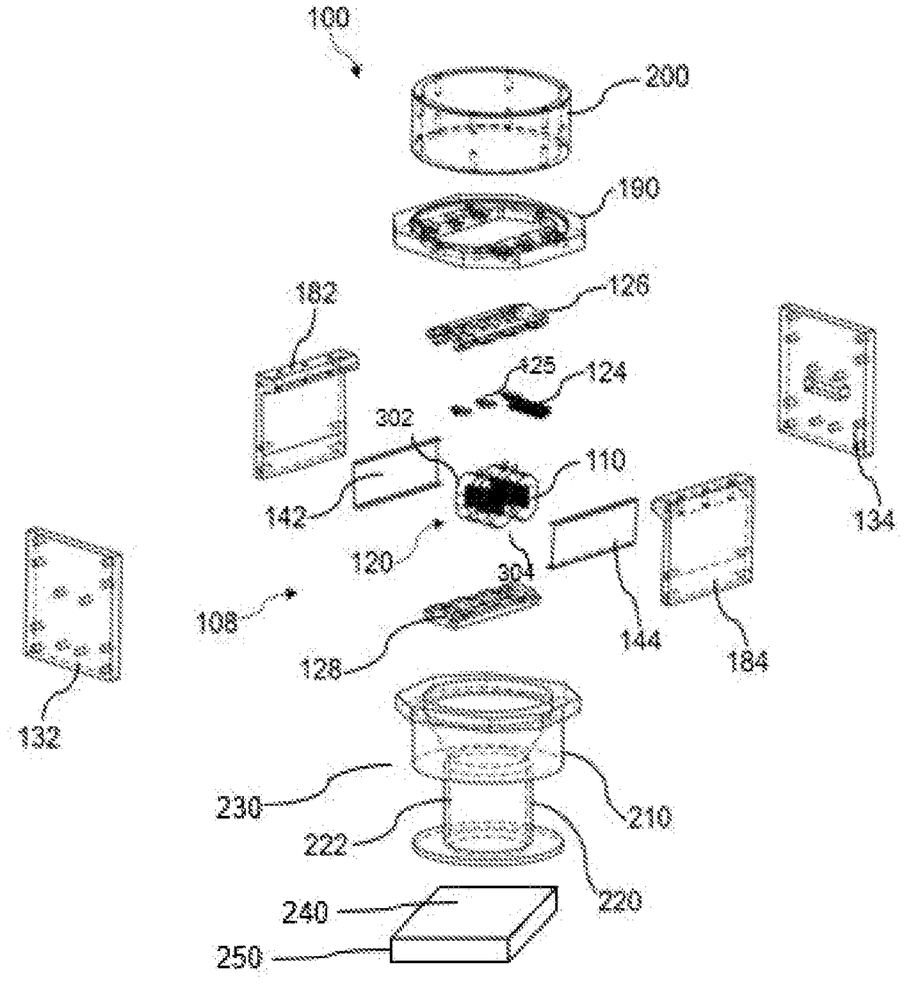
FIG. 1 depicts an exploded view of a shot peening flow control valve, in accordance with some aspects of the present disclosure.

FIG. 1 depicts an exploded view of a shot peening flow control valve 100, in accordance with some aspects of the present disclosure.

In an aspect of the present disclosure, the shot peening flow control valve 100 may comprise a core set 130. The core set 130 includes at least one magnetic unit for providing a magnetic field. The at least one magnetic unit includes a permanent magnet 110 and an electromagnetic assembly 120. In one non-limiting aspect of the present disclosure, the shot peening flow control valve 100 may comprise a plurality of core set 130.

The at least one magnetic unit may be enclosed inside a housing 140. The housing 140 may comprise a core set top 126 for shielding the at least one magnetic unit from the ferromagnetic media coming on the at least one magnetic unit 120, a first core set side covering 142 a second core set side covering 144 disposed at opposite sides of the at least one magnetic unit 120. The core set side coverings 142 and 144 comprises a covering plate aligned with a flow direction of the ferromagnetic media and the covering plate is aligned at an angle with a centerline of the passage or a flow direction of the ferromagnetic media or ferromagnetic medium 102. The housing 140 further includes a core set bottom 128 for supporting the at least one magnetic unit. The core set side coverings 142 and 144 comprising a covering plate are connected with the core set top 126 and the core set bottom 128 using a dovetail type connection. An epoxy material may be poured inside the housing 140 for forming a single solid module.

However, the type connection between the core set top 126, the core set side coverings 142 and 144, and the core set bottom 128 is not limited to dovetail type connection and any other type for connection for forming an enclosed assembly is well within the scope of present disclosure.

In an aspect, the core set top 126 and the core set bottom 128 are made up of magnetic conductor material or ferromagnetic material or ferrous material such as hardened steel. Thus, the core set top 126 and core set bottom 128 may hold the ferromagnetic medium 102 when the shot peening flow control valve is in closed state. In one non-limiting aspect, the core set side coverings 142 and 144 of the housing 140 and core set fixture may be made up of non-ferromagnetic material, non-magnetic, or non-ferrous material such as stainless steel. This prevents accumulation of ferromagnetic medium 102 in these areas during the operation of the shot peening flow control valve or the shot peening flow control valve is in open state.

In one non-limiting aspect of the present disclosure, the housing 140 may optionally comprise a front cover 132 and a rear cover 134 to enclose the at least one magnetic unit 120 from a front and a rear end.

In an aspect, the core set 130 may be arranged between a first end and a second end of a passage 280. The passage 280 may be internal to a shot peening machine or a shot blasting machine. The passage 280 may be a blast tunnel, a channel or a tube. The first end of the passage 280 may be an inlet or entrance of the shot peening flow control valve and the second end of the passage 280 may be an outlet or exit of the shot peening flow control valve. The core set 130 may be arranged within the passage 280 or within the proximity of the passage 280. In one non-limiting aspect, the core set 130 is disposed in a middle position of the passage 280 in dividing the passage 280 into a first passage 284 and a second passage 288.

In one non-limiting aspect of the present disclosure, the shot peening flow control valve may comprise an inlet 200, a top plate 190, a left guide 182, a right guide 184, a mass flowmeter 230 comprising a media distributor 210 and a flow sensor 220 that comprises a solenoid coil 222. The top plate 190 is connected the inlet 200 and the left guide 182 and the right guide 184. The front cover 132 and the rear cover 134 may also be connected to the left guide 182 and the right guide 184. The media distributor 210 is placed and connected at the bottom of the left guide 182, the right guide 184, the front cover 132, and the rear cover 134 to form an enclosed assembly for placing the core set 130 housing 140.

In one aspect, the left guide 182 and the right guide 184 may be made up of non-ferrous material such as plastic or 3D print material such as, but not limited to, Polypropylene, Polyurethane, Acrylonitrile Butadiene Styrene, or Polylactic Acid. However, the material used is not limited to above example, any other non-conducting material is well within the scope of present disclosure.

Figure 6:
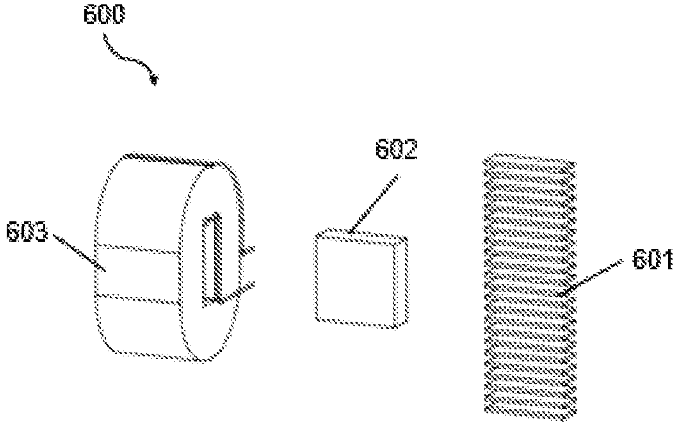
FIG. 6 depicts an assembly diagram of an electromagnet in the shot peening flow control valve, in accordance with some aspects of the present disclosure.

In an aspect of the present disclosure, the electromagnetic assembly 120 includes a first electromagnet 600 and a second electromagnet 600 having a hollow core, an inductor coil 603 looped across each of the core, and a ferrite isolator 602 inserted inside the hollow core of each electromagnet 600, as illustrated in FIG. 6.

In one non-limiting aspect of the present disclosure, the ferrite isolator 602 may be a single block. In another non-limiting aspect, the ferrite isolator 602 may be replaced by a plurality of plates 601 stacked together and inserted inside the hollow core of each electromagnet.

In one non-limiting aspect, a thermally conductive tape may be wrapped around the first and the second electromagnet. The thermally conductive tape and the ferrite isolator 602 may be a high temperature tape made up of polyimide. However, the material used is not limited to above example and any other high temperature tape is well within the scope of present disclosure.

The electromagnet cores are made of a ferromagnetic material that allows the magnetic flux to pass efficiently. Preferably, the electromagnet cores are made of thin metal sheets stacked to reduce the effect of eddy currents and minimize eddy current effect.

In an aspect, the permanent magnet 110 may be placed between an electromagnetic assembly formed by the first and the second electromagnet such that the core of the first electromagnet is connected to the first end of the permanent magnet and the core of the second electromagnet is connected to the second end of the permanent magnet. The permanent magnet 110 may be configured to generate a magnetic field is operable to generate a magnetic field at the passage 280 in order to arrest the flow of ferromagnetic media independently near a housing 140 of the core set 130.

In an aspect of the present disclosure, the shot peening flow control valve 100 may also comprise a control unit 124. The control unit 124 is in communication with any of the first and second electromagnets in order to regulate magnetic fields of the first and second electromagnets. The control unit 124 may comprise a power supply assembly and is configured to control a current flowing through each of the inductor coils, generate magnetic fields through the first and the second electromagnet to offset the magnetic field generated by the permanent magnet, and regulate the flow of the ferromagnetic media through the passage 280.

In an aspect, each one of the control unit 124 may comprise a magnetometer 125 for detecting magnetic field strength of magnetic unit of the core set 130.

In one aspect of the present disclosure, the generated magnetic field cancels the magnetic field of the permanent magnet 110 and start or release the flow of ferromagnetic media in the passage 280, if the magnetic field and the magnetic fields of the electromagnets are oriented in opposite direction.

In another aspect of the present disclosure, the generated magnetic field adds to a strength of the magnetic field of the permanent magnet 110 and contributes in the accumulation or arrest of the ferromagnetic media near the housing 140 of the core set 130, if the magnetic field and the magnetic fields of the electromagnets are oriented in same direction.

In an aspect, a strength of magnetic field generated by the electromagnetic assembly varies based on the current flowing through the inductor coils and a number of turns of the inductor coils. The regulation of the flow includes increasing, decreasing, or stopping the flow of ferromagnetic media between the first end and the second end of the passage 280.

In an aspect, a portion of the core set 130 comprises a magnetic field conductor for conducting magnetic fields around the core set 130. The portion may be a component of the core set 130 that conducts the magnetic field around the permanent magnet 110, the first electromagnet, and the second electromagnet.

In an aspect, the media distributor 210 is operable to scatter the ferromagnetic media for measuring by the flow sensor 220. In one non-limiting aspect, the flow sensor or media sensor 220 may be an inductive sensor comprising a solenoid coil 222 and operable to detect a flow rate of the ferromagnetic media passing through the solenoid coil 222. To detect the flow rate, the inductive sensor is configured to measure an induced current in the solenoid coil 222 as the ferromagnetic media passed through the solenoid coil 222 and determine the flow rate of the ferromagnetic media in the passage 280 based on the induced current. In another non-limiting aspect, the flow sensor may be a microwave sensor. However, the flow sensor is not limited to above examples and any other type of flow/wave sensor is well within the scope of present disclosure.

In one non-limiting aspect, the flow sensor may comprise a microwave sensor. However, the flow sensor is not limited to above examples and any other type of flow/wave sensor is well within the scope of present disclosure.

In one non-limiting aspect, the control unit 124 is configured to regulate the flow of the ferromagnetic media in the passage 280 based on the determined flow rate. The measured flow rate of the ferromagnetic media is used as a closed loop control shot peening flow control valve, having feedback control scheme.

In another non-limiting aspect, the shot peening flow control valve 100 may further comprise a temperature sensor connected to the housing 140 of the core set 130 and configured to measure a temperature of the housing 140. The temperature sensor is in communication with the control unit 124, and the control unit 124 is configured to control the current flowing through each of the inductor coil based on the measured temperature, thereby protecting the permanent magnet 110 from getting demagnetized or damaged due to the increase in temperature of the housing 140.

In an aspect, the at least one magnetic unit further comprises at least one heat insulator attached to an end of the permanent magnet 110. The at least one insulator may be heat insulation plate to shield the permanent magnet from excessive heat generated by the first and the second electromagnet, thereby protecting the permanent magnet 110 from heat damage.

In an aspect of the present disclosure, the at least one magnetic unit further comprises at least one heat conductive plate attached to an end of any of the first and second electromagnets. The at least one heat conductive plate may be connected to the first and second electromagnets in order to dissipate heat from the first and second electromagnets to the housing 140. The housing 140 may include at least one head sink to absorb the dissipated heat of the housing 140.

In an aspect of the present disclosure, the control unit 124 and the power assembly may be electrically connected along with necessary components on a first printed circuit board (PCB).

Accordingly, the shot peening flow control valve 100 of the present disclosure facilitates an efficient control of the flow of ferromagnetic media for enhancing properties of the metal parts, reducing operating costs, and improving the reliability of shot peening process.

Figure 2:
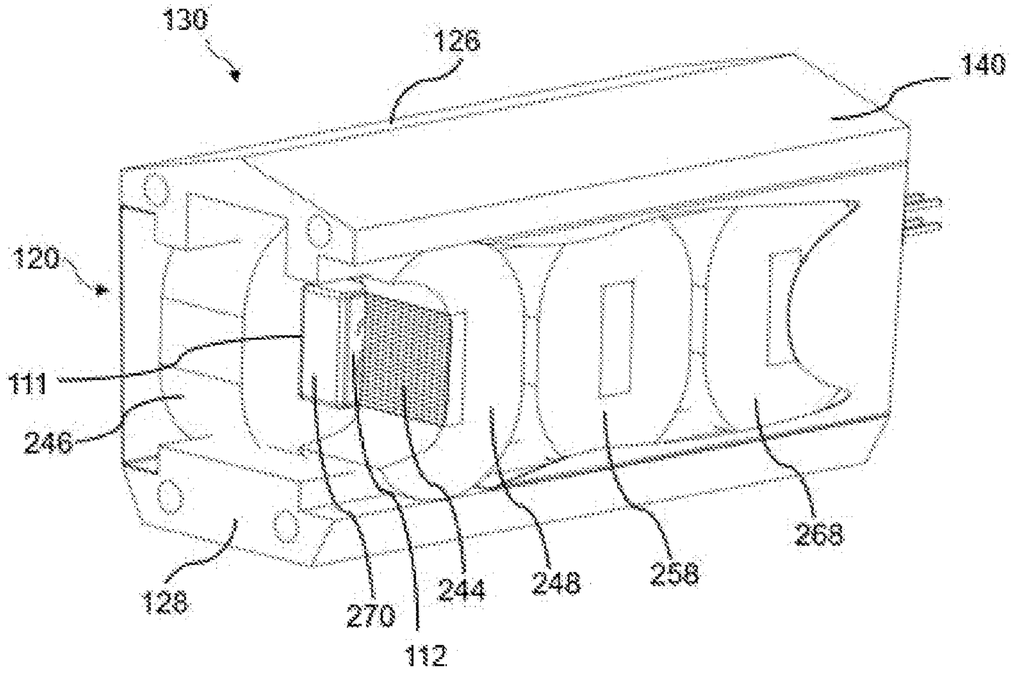
FIG. 2 depicts a perspective view of a core set of a shot peening flow control valve, in accordance with some aspects of the present disclosure.

FIG. 2 depicts a perspective view of a core set 130 of a shot peening flow control valve, in accordance with some aspects of the present disclosure.

In an aspect, the permanent magnet comprises a first permanent magnet 270, a second permanent magnet 272, and a third permanent magnet 274. The electromagnetic assembly 120 comprises a plurality of electromagnet cores 246, 248, 256, 258, 266, and 268. The first permanent magnet 270 is connected to a first left electromagnet core 246 and a first right electromagnet core 248, respectively, the second permanent magnet 272 is connected to a second left electromagnet core 256 and a second right electromagnet core 258, respectively, and the third permanent magnet 274 is connected to a third left electromagnet core 266 and a third right electromagnet core 268, respectively.

The core set 130 further includes a plurality of inductor coils 242, 244, 252, 254, 262, and 264. The first left electromagnet core 246 is located within the inductor coil 242, the first left electromagnet core 248 is located within the inductor coil 244, the second left electromagnet core 256 is located within the inductor coil 252, the second right electromagnet core 258 is located within the inductor coil 256, the third left electromagnet core 266 is located within the inductor coil 262, and the third right electromagnet core 268 is located within the inductor coil 264.

In an aspect of the present disclosure, when the shot peening flow control valve 100 is de-energized or is in off state, the magnetic field provided by the permanent magnet 110 on the ferromagnetic media 102 that fall on the triangular core set top 126. The ferromagnetic media 102 accumulates on both sides of the shot peening flow control valve 100, i.e., one side of the first left electromagnet core 246, the second left electromagnet core 256 and the third left electromagnet core 266; and the other side of the first right electromagnet core 248, the second right electromagnet 258 and the third right electromagnet core 268, thereby preventing flow through the passage 280.

Figure 3:
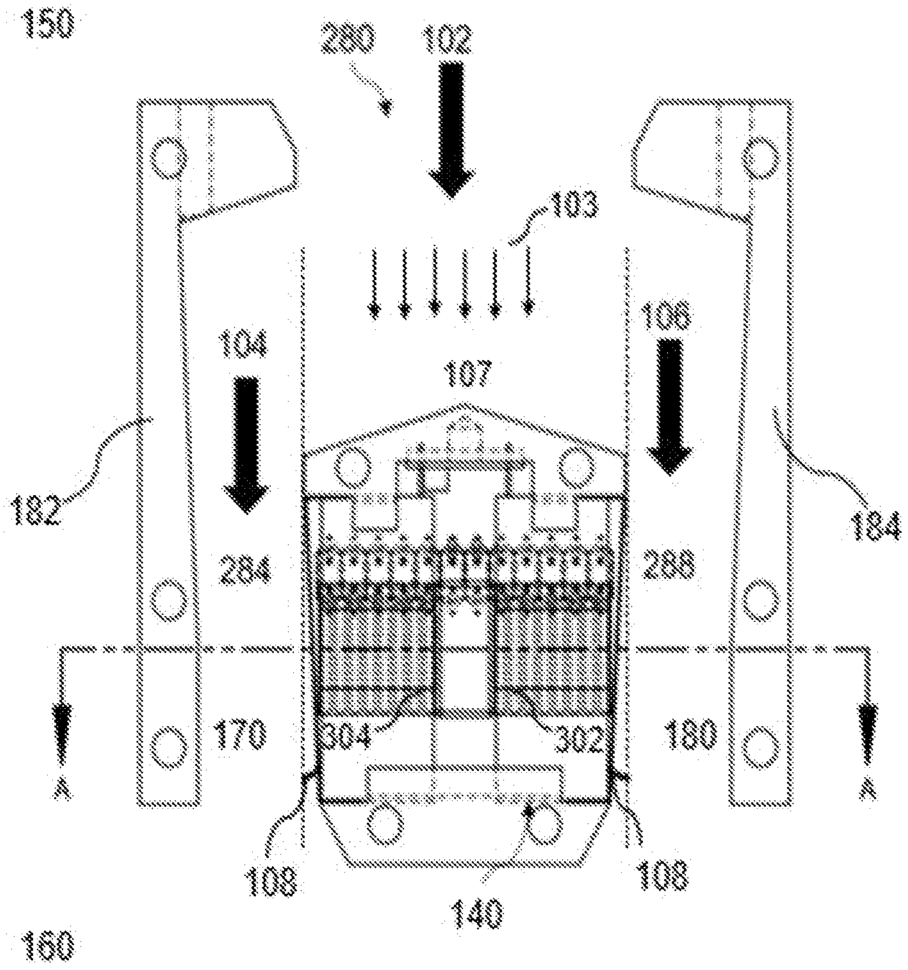
FIG. 3 depicts a front view of a shot peening flow control valve, in accordance with some aspects of the present disclosure.

FIG. 3 depicts a front view of a shot peening flow control valve 100, in accordance with some aspects of the present disclosure.

In an aspect of the present disclosure, the shot peening flow control valve 100 may be placed inside a passage 280. The housing 140 of the shot peening flow control valve 100 forms a first passage 284 between the housing 140 of the shot peening flow control valve 100 and a left guide 182 of the passage 280 and a second passage 288 between the shot peening flow control valve 100 and the right guide 184 of the passage 280.

In an aspect of the present disclosure, the ferromagnetic media 102 incident on the top of the shot peening flow control valve 100 is shunted into the first passage 284 and the second passage 288. When the electromagnetic assembly 120 is energized by generating magnetic fields through the electromagnetic assembly to cancel the magnetic field of the permanent magnet 110. The shot peening flow control valve 100 is opened, a ferromagnetic medium 104 and a ferromagnetic medium 106 of the ferromagnetic media 102 respectively flow from the first passage 284 and the second passage 288.

Figure 4:
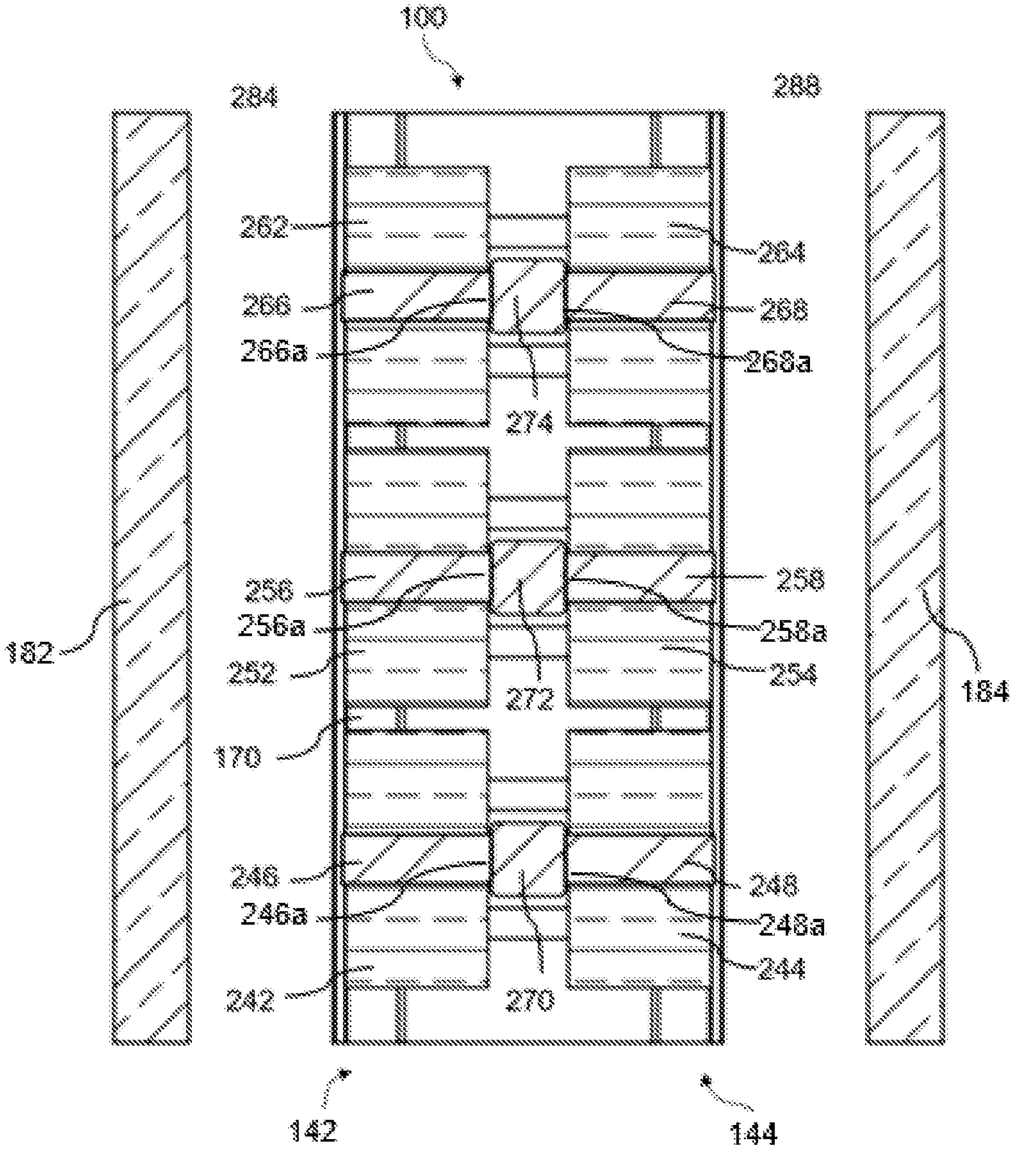
FIG. 4 depicts a cross-sectional view along the dashed line A-A as shown in FIG. 3, in accordance with some aspects of the present disclosure.

FIG. 4 depicts a cross-sectional view along the dashed line A-A as shown in FIG. 3, in accordance with some aspects of the present disclosure.

In an aspect, the ferromagnetic medium 104 and the ferromagnetic medium 106 of the ferromagnetic medium 102 flow through the first passage 284 and the second passage 288, respectively. The first core set side covering 142 and the second core set side covering 144 may guide the ferromagnetic medium 104 and the ferromagnetic medium 106 through their respective passages 284 and 288.

In one non-limiting aspect, the first core set side covering 142 and the second core set side covering 144 may be configured at an angle of the flow of the ferromagnetic medium 104 and the ferromagnetic medium 106. At the same time, the shot peening flow control valve 100 and the front inner wall and the rear inner wall of the passage 280 are in close contact and the ferromagnetic medium 102 cannot pass through on the front and the rear end.

Figure 5:
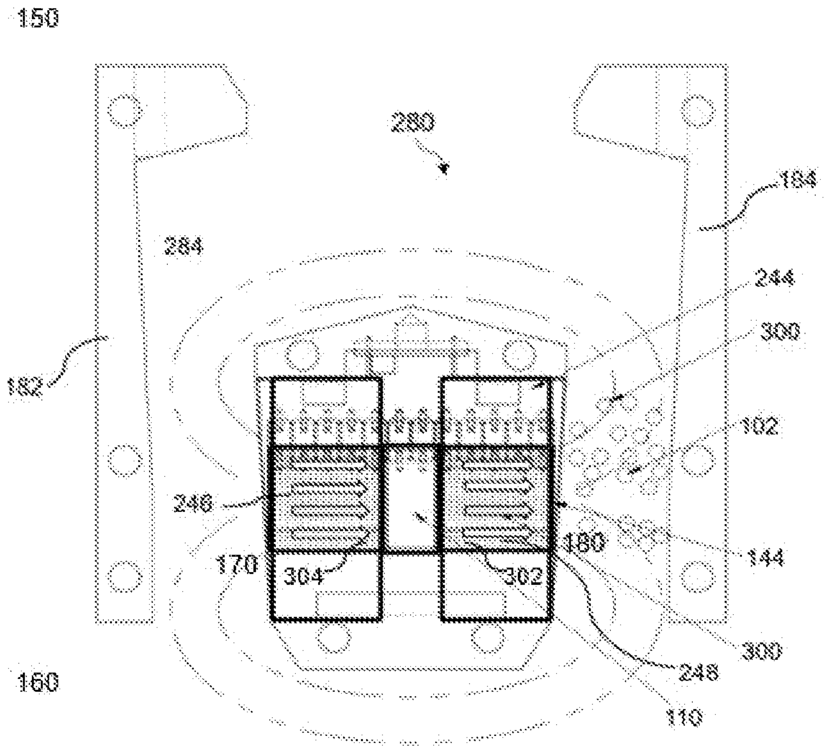
FIG. 5 depicts the magnetic field distribution of a shot peening flow control valve in the closed state, in accordance with some aspects of the present disclosure.

FIG. 5 depicts the magnetic field distribution of a shot peening flow control valve 100 in a closed state, in accordance with some aspects of the present disclosure.

The magnetic field 300 generated by the permanent magnet 110 reaches the first passage 284 and the second passage 288 from the first left electromagnet core 246 and the first right electromagnet core 248, respectively, so that the ferromagnetic medium 102 collects near the first left electromagnet core 246 and the first right electromagnet core 248 and cannot pass through the first passage 284 and the second passage 288. At this point, the shot peening flow control valve 100 is in closed state or non-conducting state.

In one non-limiting aspect of the present disclosure, the any of the electromagnets of the electromagnetic assembly 120 may be configured to generate a magnetic field oriented in the direction of the magnetic field 300 to strengthen the magnetic field provided on the ferromagnetic media 102 to accumulate or arrest the ferromagnetic media 102 near the core set side coverings 142 and 144 in the closed state of the shot peening flow control valve 100.

FIG. 6 depicts an assembly diagram of an electromagnetic assembly in the shot peening flow control valve, in accordance with some aspects of the present disclosure.

In accordance with an aspect, an electromagnetic assembly comprises a first and a second electromagnet 600 having a hollow core. Each electromagnet core 600 may be wrapped with a respective inductor coil 603. A ferrite isolator 602 may be inserted into the core for conducting heat. In one non-limiting aspect, the ferrite isolator 602 may be replaced by a stack of plurality of ferrite pins 601.

In one non-limiting aspect, a thermally conductive tape may be wrapped around each of the electromagnet cores. The thermally conductive tape and the ferrite isolator 602 may be a high temperature tape made up of polyimide. The inductor coil may be made of copper. However, the materials used is not limited to above examples and any other material having the similar properties is well within the scope of present disclosure.

Figure 7:
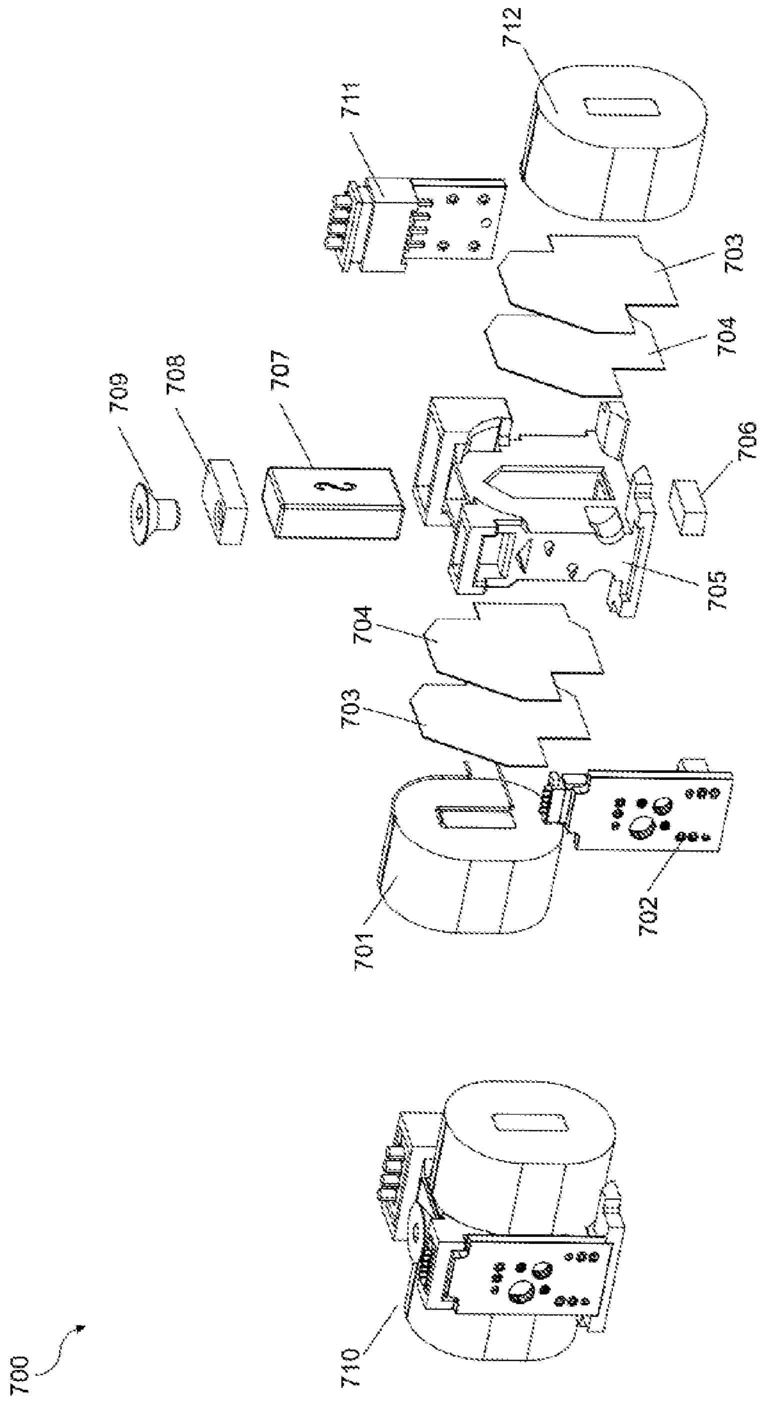
FIG. 7 depicts an assembled view and exploded view of a core-set magnetized (CSM) setup or a magnetic unit, in accordance with some aspects of the present disclosure.

FIG. 7 depicts an assembled view 700 and exploded view of a core-set magnetized (CSM) setup 710, or a magnetic unit 710, in accordance with some aspects of the present disclosure.

In an aspect, the core-set magnetized (CSM) setup 710 may comprise a first and a second electromagnet 701 and 712, a thermal sensor 702, a pair of heat insulator plates 704, a pair of heat conducting plates 703, core set fixture 705, a bottom heat sink 706, a permanent magnet 707, a top heat sink 708, a CSM screw 709, and a core power bridge 711.

The first electromagnet 701 having a core 701*a* and a second electromagnet 712 having a core 712*a* may comprise an inductor coil looped across the core. The core power bridge 711 coupled to the inductor coils for supplying current to the inductor coils and for energizing the magnetic unit 710. The first and second electromagnet 701, 712 may be have a similar structure as the first and the second electromagnet 600 as discussed in FIG. 6.

The core set fixture 705 is present between the first and the second electromagnet 701 and 712 for connecting the permanent magnet 707 and the first and the second electromagnet 701 and 712. The permanent magnet 707 is placed between the first and the second electromagnet 701 and 712 inside the core set fixture 705. The top heat sink 708 may be placed above the core set fixture 705 and the bottom heat sink 706 may be attached or placed at the bottom of the core set fixture 705 using the CSM screw 709.

In one non-limiting aspect of the present disclosure, the permanent magnet 707 having ends 707*a* and 707*b* may be made up of strong magnetic material such as Neodymium and the top and the bottom heat sinks 708 and 706 may be made up of heat conductive material such as copper.

Each heat insulator plate 704 is placed at ends 707*a*, 707*b* of the permanent magnet 707 and the heat conducting plate 703 is arranged between electromagnet 701 and 712 and heat insulator plate 704. The heat insulator plates 704 may be configured to prevent a heat generated by the inductor coil looped across electromagnets 701 and 712 from reaching the permanent magnet 707, and the heat conducting plate 703 may be configured to transfer the heat towards the heat sinks 708 and 706 or towards the housing of the magnetic unit 710 through the core set fixture 705.

The thermal sensor or the temperature sensor 702 and core power bridge 711 may be electrically connected to the respective PCB and mounted on the sided of the core set fixture. The temperature sensor 702 may monitor the temperature of the magnetic unit 710.

Figure 8:
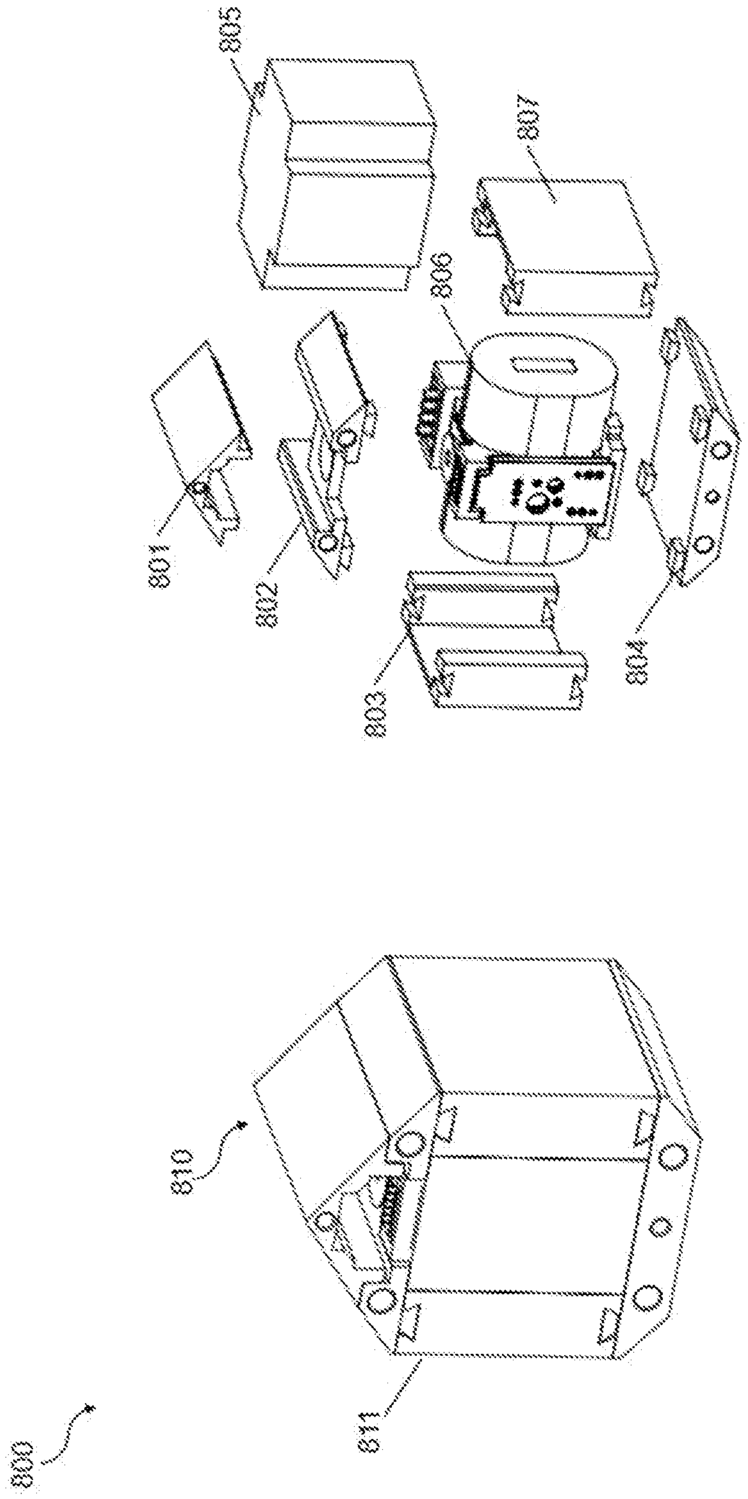
FIG. 8 depicts an assembled view and exploded view of a core set, in accordance with some aspects of the present disclosure.

FIG. 8 depicts an assembled view and exploded view of a core set (CS) 810, in accordance with some aspects of the present disclosure.

The core set 810 may comprise a housing 811 for enclosing the magnetic unit 806. The magnetic unit 806 may have an arrangement similar to that of the CSM setup 710, as discussed in above aspects. The housing 811 may include a core set top 801 and a core set fixture 802 forming the core set top assembly. The housing 811 further comprises a core set side 803, 807 present on both sides of the magnetic unit 806 near each of the first and the second electromagnet cores. The housing 811 further includes a core set bottom forming a base for supporting the magnetic unit 806. The core set sides 803 are connected with the core set top and the core set bottom 804 using a dovetail connection to form an enclosed assembly around the magnetic unit 806. In one non-limiting aspect of the present disclosure, an epoxy material 805 is poured inside the housing 811 for forming a single solid module. However, the connection of the core set sides 803 with the core set top and the core set bottom 804 is not limited to dovetail connection and any other type of connection is well within the scope of present disclosure.

In another non-limiting aspect of the present disclosure, the core set top 801 and the core set bottom 804 may be made up of magnetic conductor, ferromagnetic material, or ferrous material such as, but not limited to, hardened steel. The core set fixture 802 and the core set sides 803 may be made up of magnetic field conductor or non-ferromagnetic material or non-ferrous material such as, but not limited to, stainless steel or brass. The epoxy may be made up of material such as, but not limited to, Polyester Resins.

In an aspect, the core set 810 is disposed in a middle position of the passage in dividing the passage into a first passage and a second passage for the flow of ferromagnetic media.

Figure 9:
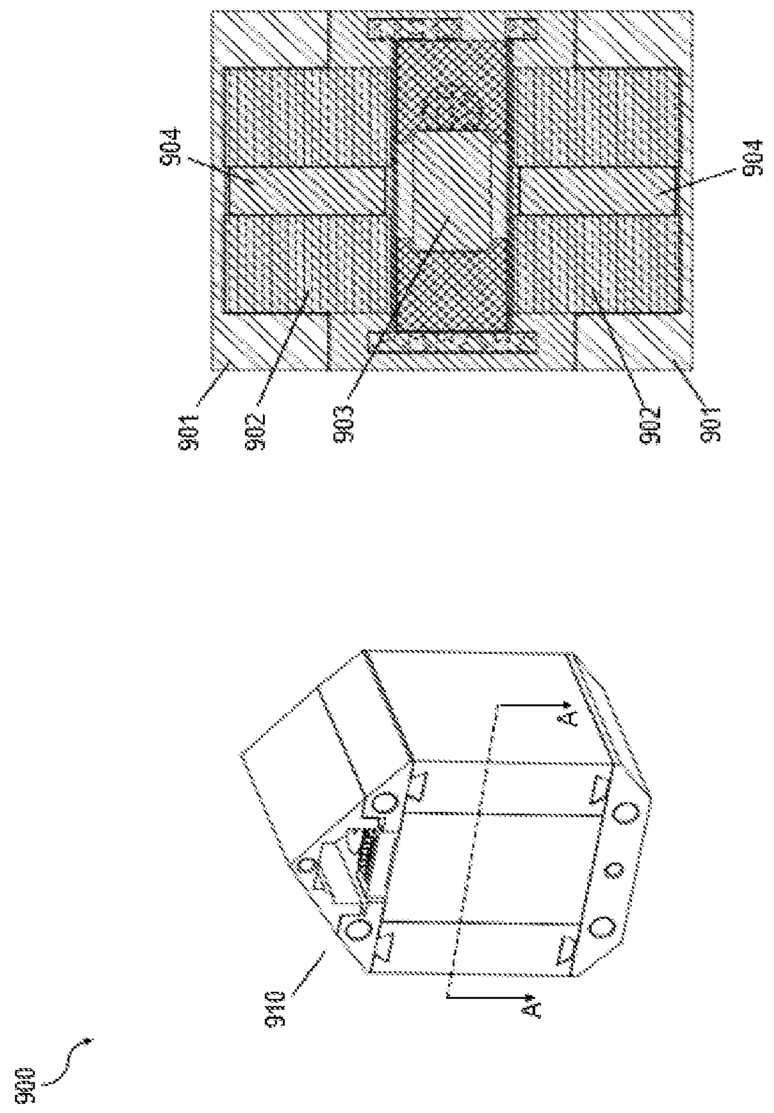
FIG. 9 depicts a cross-sectional view of the core set along the dashed line A-A, in accordance with some aspects of the present disclosure.

FIG. 9 depicts a cross-sectional view of the core set 910 along the dashed line A-A, in accordance with some aspects of the present disclosure.

The core set 910 includes a core set side 901 in close contact with the electromagnet 902 on both sided of the CSM fixture. Each of the electromagnet cores 902 comprises a ferrite isolator or a stack of ferrite pins 904 inserted into the electromagnet cores 902. The permanent magnet 903 may be placed inside the CSM fixture between the electromagnet cores 902.

Figure 10:
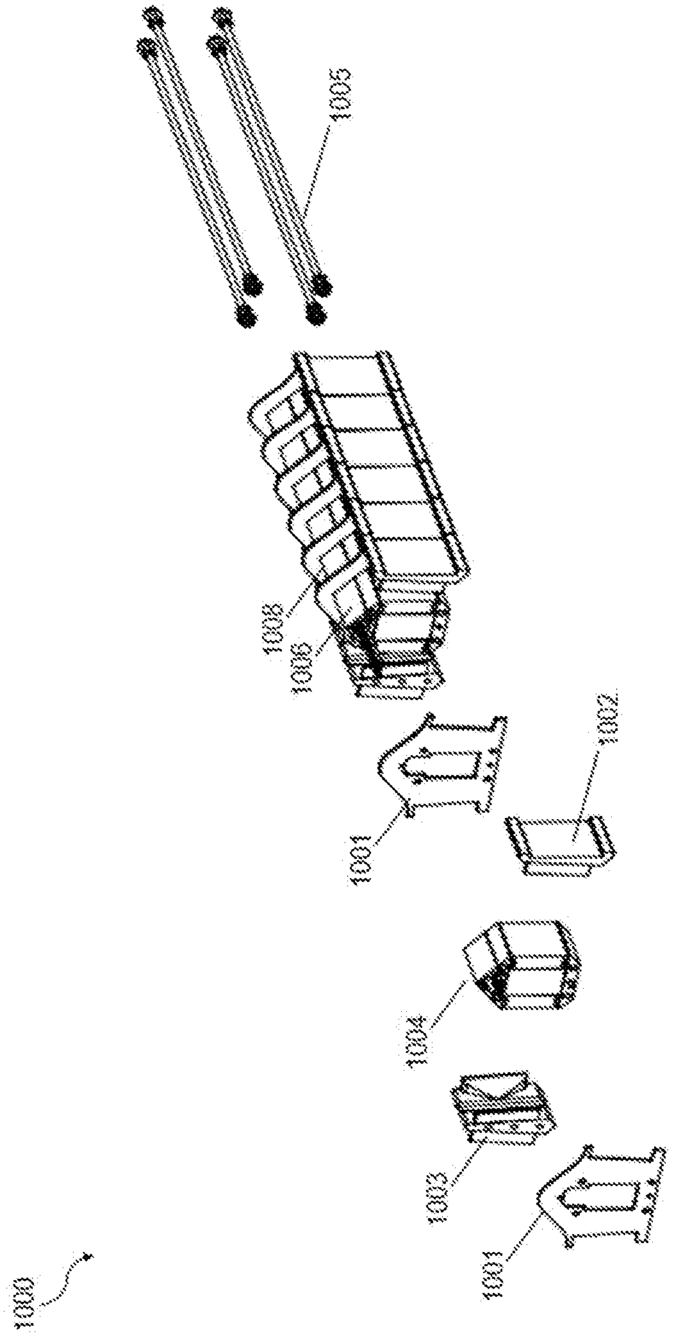
FIG. 10 depicts core line setup comprising a plurality of core sets connected together, in accordance with some aspects of the present disclosure.

FIG. 10 depicts core line 1000 setup comprising a plurality of core sets connected together, in accordance with some aspects of the present disclosure.

The core line 1000 may comprise plurality of core set splitters 1001, a plurality of core sets 1004 connected to each other through a plurality of shafts 1005 such that a core splitter 1001 is placed between one of the plurality of core sets 1004, 1006, 1008. The core line 1000 further comprise a core set splitter 1001 present at the front end of the core line 1000 and a core set splitter 1001 at the rear end of the core line 1000.

The core line 1000 may further comprise extension guides 1002 and 1003 placed on both sides of a core set 1004 forming a channel on either between the core set sides and the extension guides. In one non-limiting aspect, the extension guide 1003 may comprise a central extension guide between two core lines, when two core lines are connected in parallel configuration. The central extension guide divides a passage between the two core lines into two sub-passages.

Figure 11:
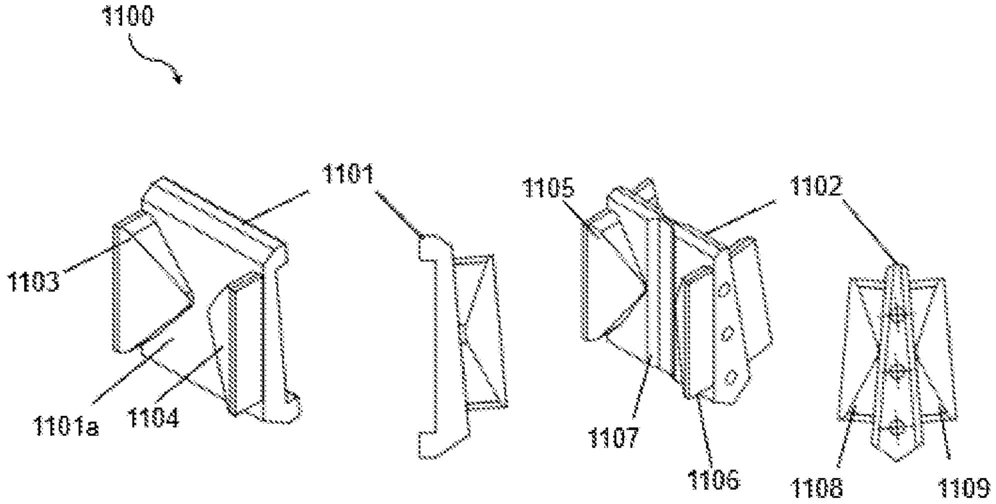
FIG. 11 depicts extension guides connected to the core set, in accordance with some aspects of the present disclosure.

FIG. 11 depicts extension guides connected to the core set, in accordance with some aspects of the present disclosure.

In an aspect of the present disclosure, the extension 1100 may comprise a side extension guide 1101 and a central extension guide 1102. The side extension guide 1101 has a couple of triangular protrusions 1103, 1104 on inner surface 1101*a* for at least one of the plurality of the core sets. The central extension guide 1102 comprises a couple of triangular protrusions 1105, 1106 located on either side 1108, 1109 of the central extension guide 1102. The couple of triangular protrusions 1105, 1106 of the central extension guide 1102 are pointing towards a single slot 1107 on each side and are configured to restrict the flow of ferromagnetic media towards the single slot.

The extension 1100 may be made up of non-ferrous material such as plastic or 3D print material such as, but not limited to, Polypropylene, Polyurethane, Acrylonitrile Butadiene Styrene, or Polylactic Acid. However, the material used is not limited to above example, any other non-conducting material is well within the scope of present disclosure.

Figure 12:
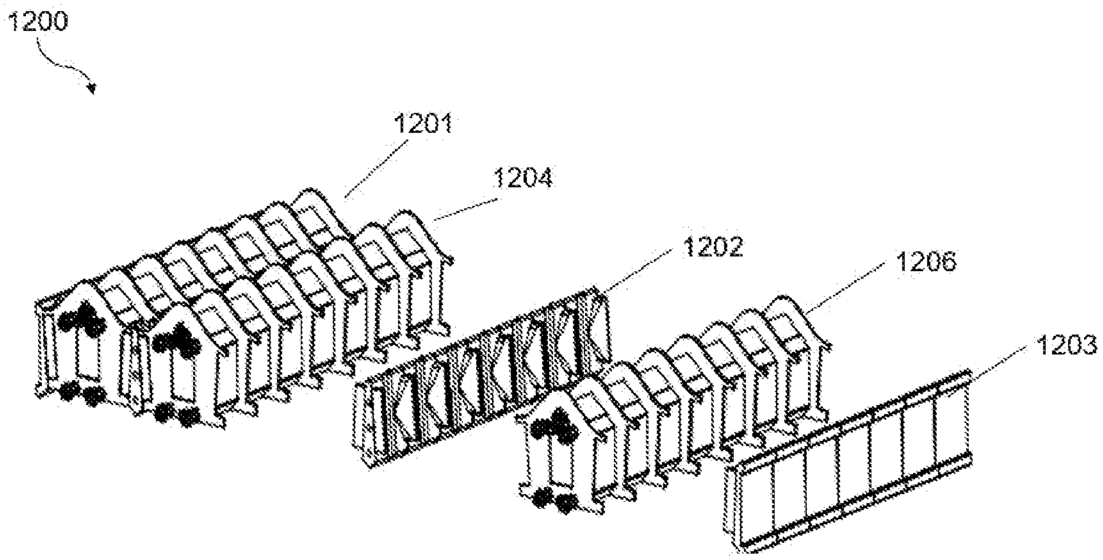
FIG. 12 depicts a core layer formed using plurality of core lines, in accordance with some aspects of the present disclosure.

FIG. 12 depicts a core layer 1200 formed using plurality of core lines, in accordance with some aspects of the present disclosure.

As shown in FIG. 12, the core layer 1200 may comprise a plurality of core lines 1201, 1204, 1206 connected in parallel configuration with each other. The core layer 1200 may comprise a central extension guide 1202 for connecting one core line 1201 with another core line 1204 in parallel configuration.

The central extension guide 1202 may comprise a couple of triangular protrusions on both sided for at least one of the plurality of the core sets of the core lines 1201, 1204, 1206 located on either side of the central extension guide 1202. The couple of triangular protrusions are pointing towards a single slot for a core set and are configured to restrict the flow of ferromagnetic media towards the slot, and the central extension guide 1202 divides a passage between the two core lines 1201, 1204 into two sub-passages.

The core layer 1200 may further comprise a side extension guide 1202 connected on opposite sides of the at least one core layer. The side extension guides 1202 may comprise a couple of triangular protrusions on inner surface for at least one of the plurality of the core sets. The side extension guides form a first outer passage and a second outer passage with the core layer 1200, and the couple of triangular protrusions are pointing towards each other and are configured to restrict the flow of ferromagnetic media in the first outer passage and the second outer passage.

In an aspect of the present disclosure, the core set top of a core set present in the core line 1201, 1204, 1206 is configured to receive the ferromagnetic media from a first end of a blast tunnel and shunt the ferromagnetic media to flow into respective sub-passages present between at least two core line 1201, 1204 and respective outer passages of the at least one core layer.

FIG. 13 an exploded view of single core set shot peening flow control valve 1300, in accordance with some aspects of the present disclosure.

The single core set shot peening flow control valve 1300 arranged between a first end and a second end of a blast tunnel for controlling the flow of ferromagnetic media in the passage. The single core set shot peening flow control valve 1300 may comprise two side frames 1301, 1308 and two central frames 1302, 1305, an inlet flange 1303, and a base diversion block 1304, a core set 1307 comprising side extension on both side of the core set housing. The inlet flange 1303 may be configured for directing the ferromagnetic media from the passage into the shot peening flow control valve 1300. The shot peening flow control valve 1300 further comprise a control unit 1306 for energizing the core set to control the flow of ferromagnetic media in the passage, as discussed in above aspect.

The side frames 1301, 1308 have two grooves on the inner end for accommodating the two outer ends of the side extensions connected to the core set 1307. The side frames 1301, 1308, the central frames 1302, 1305, inlet flange 1303 and the base diversion block 1304 may be made up of non-ferrous material. The base diversion block may act as a flow sensor fixture.

In an aspect of the present disclosure, the control unit 1306 is configured to control a current flowing through respective inductor coil of a core set, generate magnetic fields through the electromagnetic assembly formed by the first and the second electromagnet to offset/cancel the magnetic field generated by the permanent magnet, and regulate the flow of the ferromagnetic media into outer passage of the core set 1307.

In an aspect, each one of the control units 1306 may comprise a magnetometer 1320 for detecting magnetic field strength of magnetic unit of the core set 1307.

In an aspect of the present disclosure, the base diversion block 1304 or a flow sensor fixture comprises a media distributor located at the second end of the passage and operable to scatter the ferromagnetic media for measuring flow rate, and a mass flowmeter comprising a flow sensor coupled to the media distributor. In one non-limiting aspect, the flow sensor may comprise an inductive sensor comprising a solenoid coil and configured to measure flow rate of the ferromagnetic media passing through the solenoid coil, as discussed in above aspects. In another non-limiting aspect, the flow sensor may be a microwave sensor. However, the flow sensor is not limited to above examples and any other type of flow/wave sensor is well within the scope of present disclosure.

In one aspect of the present disclosure, the control unit 1306 may be configured to control the flow of the ferromagnetic media based on the measured flow rate. In another aspect of the present disclosure, the core set driver circuit may be configured to control the flow of the ferro magnetic media based on a measured temperature of the housing of the core set 1307.

Thus, the shot peening flow control valve 1300 of the present disclosure facilitates an efficient control of the flow of ferromagnetic media for enhancing properties of the metal parts, reducing operating costs, and improving the reliability of shot peening process.

FIG. 14 an assembled view of single core set shot peening flow control valve 1400, in accordance with some aspects of the present disclosure.

The core set is enclosed inside an outer housing 1401 formed by the side frames, the central frames, the inlet flange and the base diversion block, as discussed in FIG. 13. The core set is in close contact and fixed with the central frame on the front and rear end using the plurality of shafts.

In one aspect, the single core set shot peening flow control valve 1400 may be placed inside the passage between a first end and a second end. In another aspect, the single core set shot peening flow control valve 1400 may be arranged between opposite sides of the passage.

FIG. 15 depicts an exploded view of single layer dual core line shot peening flow control valve, in accordance with some aspects of the present disclosure.

The single layer dual core line shot peening flow control valve 1500 arranged between a first end and a second end of a passage for controlling the flow of ferro magnetic media in the passage. The shot peening flow control valve 1500 may comprise two side frame 1501, 1508 and two central frames 1502, 1505, an inlet flange 1503, and a base diversion block 1504 or flow sensor fixture, a core layer 1507 comprising side extension on both side of the core housing and an extension guide between the core lines of the core layer 1507.

The inlet flange 1503 may be configured for directing the ferromagnetic media from the blast tunnel into the shot peening flow control valve 1500. The shot peening flow control valve 1500 further comprise a plurality of core set driver circuit 1506 for energizing at least one of the plurality of core sets present in the core layer 1507 and controlling the flow of ferromagnetic media in the blast tunnel, as discussed in above aspect.

The side frames 1501, 1508 have two grooves on the inner end for accommodating the two outer ends of the side extensions connected to the core layer 1507. The side frames 1501, 1508, the central frames 1502, 1505, inlet flange 1503 and the base diversion block 1504 may be made up of non-ferrous material.

In an aspect of the present disclosure, the plurality of control units 1506 is configured to control a current flowing through respective inductor coil of core set of a core line, generate magnetic fields through the electromagnetic assembly to offset the magnetic field generated by the permanent magnet, and regulate the flow of ferromagnetic media into the respective sub-passages present between at least two core line and/or the respective outer passages of the at least one core layer.

In an aspect, each one of the control units 1506 may comprise a magnetometer 1520 for detecting magnetic field strength of magnetic unit of the plurality of core sets.

In an aspect of the present disclosure, the base diversion block 1504 comprises a media distributor located at the second end of the passage and operable to scatter the ferromagnetic media for measuring flow rate, and a mass flowmeter comprising a flow sensor coupled to the media distributor. In one non-limiting aspect, the flow sensor may comprise an inductive sensor comprising a solenoid coil and configured to measure flow rate of the ferromagnetic media passing through the solenoid coil, as discussed in above aspects. In another non-limiting aspect, the flow sensor may be a microwave sensor. However, the flow sensor is not limited to above examples and any other type of flow/wave sensor is well within the scope of present disclosure.

In one aspect of the present disclosure, the shot peening flow control valve 1500 comprises a central control unit in communication with the plurality of control units. The plurality of control units 1506 coupled to the inductor coils through the respective power bridge of a core set.

The central control unit is configured to control the plurality of core set driver circuits 1506 to regulate the flow of the ferromagnetic media based on the measured flow rate. In another aspect of the present disclosure, the central control unit is configured to control the plurality of control units 1506 to control the flow of the ferromagnetic media based on a measured temperature of the housing of the respective core set.

In one non-limiting aspect, the central control unit may turn off a core set if the temperature of the housing of the core set increases a predetermined threshold temperature, thereby protecting the permanent magnet of the core set from damage due to high temperature.

FIG. 16 depicts an assembled view of single layer dual core line shot peening flow control valve 1600, in accordance with some aspects of the present disclosure.

The core layer is enclosed inside an outer housing 1601 formed by the side frames, the central frames, the inlet flange and the base diversion block, as discussed in FIG. 15. The core layer is in close contact and fixed with the central frame on the front and rear end using the plurality of shafts. The single layer dual core line shot peening flow control valve 1600 may be placed in the middle of the passage between the first end and the second end.

FIG. 17 depicts a cross-sectional view of a shot peening flow control valve 1710 along the dashed line A-A, in accordance with some aspects of the present disclosure.

As shown in FIG. 17, the core sets of the core lines 1702 and 1704 forms a first outer passage 1701 and a second outer passage 1706 with the side extension guides present on the respect side of the core layer. The core lines 1702 and 1704 further forms inner sub-passages 1703 and 1705 with the central extension guide used for connected the core lines 1702 and 1704.

FIG. 18 depicts a perspective view of a shot peening flow control valve 1800, in accordance with some aspects of the present disclosure.

As shown in FIG. 18, the shot peening flow control valve 1800 comprise multiple core lines 1801 and 1803 and stacked together using a central extension guide 1802. Each core line comprises a number of core set connected to each other and separated by a core set splitter 1804.

FIG. 19 an exploded view of single layer multiple core lines shot peening flow control valve 1900, in accordance with some aspects of the present disclosure.

The single layer multiple core lines shot peening flow control valve 1900 arranged between a first end and a second end of a passage for controlling the flow of ferromagnetic media in the passage. The shot peening flow control valve 1900 may comprise two side frame 1901, 1908 and two central frames 1902, 1905, an inlet flange 1903, and a base diversion block 1904 or flow sensor fixture, a core layer 1907 comprising side extension on both side of the core housing and an extension guide between the core lines of the core layer 1907.

The inlet flange 1903 may be configured for directing the ferromagnetic media from the passage into the shot peening flow control valve 1900. The shot peening flow control valve 1900 further comprise a plurality of control units 1906 for energizing at least one of the plurality of core sets present in the core layer 1907 and controlling the flow of ferromagnetic media, as discussed in above aspect.

The side frames 1901, 1908 have two grooves on the inner end for accommodating the two outer ends of the side extensions connected to the core layer 1907. The side frames 1901, 1908, the central frames 1902, 1905, inlet flange 1903 and the base diversion block 1904 may be made up of non-ferrous material.

In an aspect of the present disclosure, the plurality of control units 1906 is configured to control a current flowing through respective inductor coil of a core set, generate magnetic fields through the electromagnetic assembly to offset/cancel the magnetic field generated by the permanent magnet, and regulate the flow of ferromagnetic media into the respective sub-passages present between at least two core line and/or the respective outer passage of the at least one core layer.

In an aspect, each one of the control units 1906 may comprise a magnetometer 1920 for detecting magnetic field strength of magnetic unit of the plurality of core sets.

In an aspect of the present disclosure, the base diversion block 1904 comprises a media distributor located at the second end of the passage and operable to scatter the ferromagnetic media for measuring flow rate, and a mass flowmeter comprising a flow sensor coupled to the media distributor. In one non-limiting aspect, the flow sensor may comprise an inductive sensor comprising a solenoid coil and configured to measure flow rate of the ferromagnetic media passing through the solenoid coil, as discussed in above aspects. In another non-limiting aspect, the flow sensor may be a microwave sensor. However, the flow sensor is not limited to above examples and any other type of flow/wave sensor is well within the scope of present disclosure.

In one aspect of the present disclosure, the shot peening flow control valve 1900 comprises a central control unit in communication with the plurality of control unit 1906. The plurality of control units 1906 coupled to the inductor coils through the respective power bridge of a core set.

The central control is configured to control the plurality of control units 1906 to regulate the flow of the ferromagnetic media based on the measured flow rate. In another aspect of the present disclosure, the central control unit is configured to control the plurality of core set driver circuits 1906 to control the flow of the ferro magnetic media based on a measured temperature of the housing of the respective core set.

In one non-limiting aspect, the central control unit may turn off a core set if the temperature of the housing of the core-set increases a predetermined threshold temperature, thereby protecting the permanent magnet of the core set from damage due to high temperature.

FIG. 20 depicts an assembled view of single layer multiple core lines shot peening flow control valve 2000, in accordance with some aspects of the present disclosure.

The core layer is enclosed inside an outer housing formed 2001 by the side frames, the central frames, the inlet flange and the base diversion block, as discussed in FIG. 19. The core layer is in close contact and fixed with the central frame on the front and rear end using the plurality of shafts. The shot peening flow control valve 2000 may be placed in the middle of the passage between the first end and the second end of the passage for regulating the flow of ferromagnetic media in the passage.

FIG. 21 depicts an exploded view of multi-layer shot peening flow control valve 2100, in accordance with some aspects of the present disclosure.

The shot peening flow control valve 2100 arranged between a first end and a second end of a passage for controlling the flow of ferromagnetic media in the passage. The shot peening flow control valve 2100 may comprise two side frame 2101, 2110 and two central frames 2102, 2109, an inlet flange 2103, and a base diversion block 2104 or flow sensor fixture, a plurality of core layers i.e., an upper core layer 2107 and a lower core layer 2108 comprising side extension on both side of the core housing and an extension guide between the core lines of lower core layer 2108. The shot peening flow control valve 2100 further includes layer splitter frames 2105 for splitting the at least two core layers 2107 and 108 into different levels 2131, 2132 such as upper core layer 2107 and the lower core layer 2108. The layer splitter frames 2105 are staggery position at the passage 280 for transferring the ferromagnetic medium 102.

The inlet flange 2103 may be configured for directing the ferromagnetic media from the blast tunnel into the shot peening flow control valve 2100. The shot peening flow control valve 2100 further comprise a plurality of control units 2106 for energizing at least one of the plurality of core sets present in the plurality of core layer 2107 and controlling the flow of ferromagnetic media in the passage, as discussed in above aspect.

The side frames 2101, 2110 have two grooves on the inner end for accommodating the two outer ends of the side extensions connected to the upper core layer 2107. The side frames 2101, 2110, the central frames 2102, 2109, inlet flange 2103 and the base diversion block 2104 may be made up of non-ferrous material.

In an aspect of the present disclosure, the plurality of control units 2106 is configured to control a current flowing through respective inductor coil of a core set, generate a magnetic field through the electromagnetic assembly to offset/cancel the magnetic field generated by the permanent magnet, and regulate the flow of ferromagnetic media into the respective sub-passages present between at least two core line and/or the respective outer passage of the at least one core layer.

In an aspect, each one of the control units 2106 may comprise a magnetometer 2120 for detecting magnetic field strength of magnetic unit of the plurality of core sets.

In an aspect of the present disclosure, the base diversion block 2104 comprises a media distributor located at the second end of the passage and operable to scatter the ferromagnetic media for measuring flow rate, and a mass flowmeter comprising a flow sensor coupled to the media distributor. In one non-limiting aspect, the flow sensor may comprise an inductive sensor comprising a solenoid coil and configured to measure flow rate of the ferromagnetic media passing through the solenoid coil, as discussed in above aspects. In another non-limiting aspect, the flow sensor may be a microwave sensor. However, the flow sensor is not limited to above examples and any other type of flow/wave sensor is well within the scope of present disclosure.

In one aspect of the present disclosure, the shot peening flow control valve 2100 comprises a central control unit in communication with the plurality of control units 2106. The plurality of control units 2106 coupled to the inductor coils through the respective power bridge of a core set.

The central control unit is configured to control the plurality of core set driver circuits 2106 to regulate the flow of the ferromagnetic media based on the measured flow rate. In another aspect of the present disclosure, the central control unit is configured to control the plurality of control units 2106 to control the flow of the ferromagnetic media based on a measured temperature of the housing of the respective core set.

In one non-limiting aspect, the central control unit may turn off a core set if the temperature of the housing of the core set increases a predetermined threshold temperature, thereby protecting the permanent magnet of the core set from damage due to high temperature.

FIG. 22 depicts an assembled view of multi-layer shot peening flow control valve 2200, in accordance with some aspects of the present disclosure.

The core layer is enclosed inside an outer housing 2201 formed by the side frames, the central frames, the inlet flange and the base diversion block, as discussed in FIG. 21. The upper core layer is in close contact and fixed with the central frame on the front and rear end using the plurality of shafts. The shot peening flow control valve 2100 may be placed inside the passage between the first end and the second end of the passage for regulating the flow of ferromagnetic media in the passage.

In an aspect of the present disclosure, a portion of the core set comprise a magnetic field conductor material for conducting magnetic fields around a core set.

In an aspect of the present disclosure, a number of core lines in each core layer and a number of core layers are varied based on a required flow rate of ferromagnetic media.

FIG. 23 depict a control unit setup schematic diagram 2300, in accordance with some aspects of the present disclosure.

In an aspect of the present disclosure, the control unit setup 2300 comprises a central control unit CS01 and a plurality of control units CS02, CS03, . . . , CS0N electrically connected with the central control unit CS01. The central control unit CS01 may be configured to control at least one control unit of the plurality of control units CS02, CS03, . . . , CS0N for regulating the flow of ferromagnetic media in at least one passage as discussed in above aspects. In one non-limiting aspect, the central control unit CS01 may be parallelly electrically connected with the plurality of control units CS02, CS03, . . . , CS0N to control the control units CS02, CS03, . . . , CS0N regulating the flow of ferromagnetic media in at least one passage as discussed in above aspects.

FIG. 24 depicts a flowchart of a method 2400 of regulating flow of ferromagnetic media in a blast tunnel, in accordance with some aspects of the present disclosure.

At block 2401, a magnetic field is provided at a passage. The magnetic field is provided by at least one core set arranged between a first end and a second end of the passage, The at least one core set comprises at least one magnetic unit enclosed inside a housing of the at least one core set. The at least one core set may form a shot peening flow control valve based on an arrangement and components, as discussed in above aspects. The body of the shot peening flow control valve encloses the passage for transferring the ferromagnetic media from the first end of the passage to the second end of the passage.

In an aspect, the providing the magnetic field at the passage may comprise generating, by a permanent magnet of the at least one magnetic unit, a magnetic field at the passage, and arresting the ferromagnetic media based on the magnetic field.

At block 2403, the ferromagnetic media is transferred from the first end of the passage to the second end of the passage. The ferromagnetic media may flow into a plurality of passages formed by the housing of the at least core set, as discussed in above aspects.

At block 2405, the flow of ferromagnetic media may be controlled between the first end and the second end of the passage based on the provided magnetic field at the passage. The controlling of the flow of ferromagnetic media between the first end and the second end may comprise regulating magnetic fields of a first electromagnet and a second electromagnet of the at least one magnetic unit. The magnetic fields of a first electromagnet and a second electromagnet may be regulated using the procedure discussed in above aspects.

In an aspect, the method 2400 may further comprise step 2407 of shielding the at least one magnetic unit from the ferromagnetic media coming from the first end. The shielding 2407 is provided by a core set top of the at least one core set.

In another aspect, the method 2400 may further comprise step 2409 of detecting, using a magnetometer, a magnetic field strength of at least one magnetic unit and step 2411 of measuring, by a mass flowmeter, a flow rate of ferromagnetic media in the passage, using the procedure discussed in above aspects.

In yet another aspect, the method 2400 may further comprise step 2413 of measuring a temperature of the housing, the electromagnets or any other parts of the shot peening flow control valve, using the procedure discussed in above aspects.

The method 2400 further comprises regulating the magnetic field provided by the at least one core set based on at least one of the measure temperature or measured flow rate.

In one non-limiting aspect, the method may control the flow of the ferromagnetic media in the passage based on the measured temperature, thereby protecting the permanent magnet of the core set from damage.

Thus, the method 2400 facilitates an efficient control of the flow of ferromagnetic media for enhancing properties of the metal parts, reducing operating costs, and improving the reliability of shot peening process.

It is to be understood that not necessarily all objectives or advantages may be achieved in accordance with any particular aspect described herein. Thus, for example, those skilled in the art will appreciate that certain aspects may be configured to operate in a manner that achieves or optimizes one advantage or group of advantages as taught herein without necessarily achieving other objects or advantages as may be taught or suggested herein.

The terms "an aspect", "aspect", "aspects", "the aspect", "the aspects", "one or more aspects", "some aspects", and "one aspect", "other aspect", "yet another aspect", "non-limiting aspect" mean "one or more (but not all) aspects of the disclosure(s)" unless expressly specified otherwise.

The various processing operations described in connection with the aspects disclosed herein can be implemented or executed by a machine such as a processor. The processor may be a microprocessor, but alternatively, the processor may be a controller, a microcontroller, or a state machine, or a combination thereof. The processor can include an electrical circuit configured to process computer executable instructions. In another aspect, the processor includes an application specific integrated circuit (ASIC), a field programmable gate array (FPGA), or other programmable device that performs logical operations without processing computer executable instructions. The processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, the processor may also include primarily analog components. For example, some or all of the signal processing algorithms described herein may be implemented by analog circuitry or mixed analog and digital circuitry. A computing environment may include any type of computer system, including, but not limited to, a computer system that is based on a microprocessor, mainframe computer, a digital signal processor, a portable computing device, a device controller, or a computing engine within the device.

The terms "including", "comprising", "having" and variations thereof mean "including but not limited to", unless expressly specified otherwise.

The enumerated listing of items does not imply that any or all of the items are mutually exclusive, unless expressly specified otherwise.

A description of an aspect with several components in communication with each other does not imply that all such components are required. On the contrary, a variety of optional components are described to illustrate the wide variety of possible aspects of the disclosed methods and systems.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the aspects of the present disclosure are intended to be illustrative, but not limiting, of the scope of the disclosure, which is set forth in the appended claims.

The invention claimed is:

1. A shot peening flow control valve for regulating flow of a ferromagnetic medium, the shot peening flow control valve comprising:
- a body enclosing a passage for transferring the ferromagnetic medium from a first end of the passage to a second end of the passage; and
- at least one core set arranged between the first end and the second end, wherein the at least one core set comprises at least one magnetic unit operable to provide a magnetic field at the passage, wherein the at least one magnetic unit comprises:
  - a permanent magnet;
  - a first electromagnet, a core of the first electromagnet is connected to a first end of the permanent magnet; and
  - a second electromagnet, a core of the second electromagnet is connected to a second end of the permanent magnet.

2. The shot peening flow control valve of claim 1, wherein the at least one core set comprises:
- a housing for enclosing the at least one magnetic unit, the housing comprising:
  - a core set top for shielding the at least one magnetic unit from the ferromagnetic medium coming from the first end; and
  - a first core set side covering and a second core set side covering disposed at sides of the at least one magnetic unit respectively,
- wherein at least one of the first core set side covering and the second core set side covering is disposed at a pole of the at least one magnetic unit for shielding the pole and providing magnetic field of the pole at the passage.

3. The shot peening flow control valve claim 1, wherein the at least one core set is disposed in a middle position of the passage in dividing the passage into a first passage and a second passage.

4. The shot peening flow control valve of claim 1, wherein the permanent magnet is operable to generate a magnetic field at the passage in order to arrest the flow of ferromagnetic medium independently.

5. The shot peening flow control valve of claim 1, wherein the magnetic unit further comprises:
- a control unit connected to any of the first and second electromagnets in order to regulate magnetic fields of the first and second electromagnets.

6. The shot peening flow control valve of claim 1, wherein a portion of the at least one core set comprises a magnetic field conductor material for conducting magnetic fields around the at least one core set.

7. The shot peening flow control valve of claim 1, wherein the at least one core set comprises a first core set and a second core set that are spaced apart, the first core set and a second core set being operable to work together.

8. The shot peening flow control valve of claim 7, wherein the first core set and the second core set are serially positioned such that the first core set and the second core set are at different distance from the first end.

9. The shot peening flow control valve of claim 7, wherein the first core set and the second core set are positioned in parallel such that the first core set and the second core set are at substantially the same distance from the first end.

10. The shot peening flow control valve of claim 9, further comprising a third core set that is positioned serially with the first core set and the second core set such that the third core set is substantially at different distance from the first end with respect to any of the first core set and/or the second core set.

11. A shot peening flow control valve for regulating a flow of ferromagnetic medium, the shot peening flow control valve comprising:
- a body defining a passage for transferring the ferromagnetic medium from a first end of the passage to a second end of the passage;
- at least one core layer arranged between the first end and the second end comprising at least one core line, wherein the at least one core layer is operable to provide a magnetic field at the passage;
- wherein the at least one core line comprises:
  - a plurality of core sets connected in with each other, wherein one of the core sets is separated from another core set by a core set splitter;
  - a plurality of shaft for connecting the plurality of core sets and the core set splitters together; and
  - a cover enclosing the at least one core layer;
  - wherein the cover comprises:
    - an inlet flange for transferring the ferromagnetic medium from the first end;
    - a first side frame and a second side disposed at sides of the at least one core layer respectively;
    - a first central frame and a second central frame disposed at a front end and a rear end of the at least one core layer;

a base diversion block disposed below the at least one core layer, the first and the second side frames, and the first and the second central frames of the cover; and a central extension guide for connecting the at least one core line with another core line in parallel configuration;

wherein the central extension guide comprises a couple of triangular protrusions on both sides for one of the core sets located on either side of the central extension guide;

wherein the couple of triangular protrusions are pointing towards a single slot; and wherein the central extension guide divides a passage between two core lines into two sub-passages.

12. The shot peening flow control valve of claim 11, further comprising:

a first side extension guide and a second side extension guide disposed at sides of the at least one core layer respectively, wherein the first side extension guide and the second side extension guide comprise a couple of triangular protrusions on an inner surface for one of the plurality of the core sets, the first side extension guide and the second side extension guide form a first outer passage and a second outer passage with the first side frame and the second side frame respectively, and the couple of triangular protrusions are pointing towards each other.

13. The shot peening flow control valve of claim 11, wherein at least one of the plurality of core sets comprises:

a magnetic unit operable to provide the magnetic field at the passage;

a housing for enclosing the magnetic unit, the housing comprising:

a core set top for shielding the magnetic unit from the ferromagnetic medium coming from the first end; and a first core set side covering and a second core set side covering disposed at sides of the magnetic unit respectively, wherein the at least one of the first core set side covering and the second core set side covering is disposed at a pole of the magnetic unit for shielding the pole and providing magnetic field of the pole at the passage.

14. The shot peening flow control valve of claim 13, wherein the magnetic unit comprises:

a permanent magnet and a first electromagnet, and a core of the first electromagnet is connected to a first end of the permanent magnet.

15. The shot peening flow control valve of claim 14, wherein the magnetic unit further comprises a second electromagnet, and a core of the second electromagnet is connected to a second end of the permanent magnet.

16. The shot peening flow control valve of claim 11, further comprises:

a central control unit; and a plurality of control units electrically connected with the central control unit, wherein a control unit is connected to any of the first and second electromagnets of respective magnetic unit in order to regulate magnetic fields of the first and second electromagnets.

17. A shot peening machine for projecting a ferromagnetic medium on a surface of at least one component, the shot peening machine comprising:

a chamber for storing the ferromagnetic medium;

a passage for transferring the ferromagnetic medium onto a surface of at least one component;

a shot peening flow control that comprises:

a body enclosing the passage for transferring the ferromagnetic medium from a first end of the passage to a second end of the passage, wherein the at least one component is placed at the second end of the passage; and at least one core set arranged between the first end and the second end, wherein the at least one core set comprises at least one magnetic unit, and the at least one magnetic unit is operable to provide a magnetic field at the passage and regulate a projection velocity of ferromagnetic medium on the surface of the at least one component, wherein the at least one magnetic unit comprises:

a permanent magnet;

a first electromagnet, a core of the first electromagnet is connected to a first end of the permanent magnet; and a second electromagnet, and a core of the second electromagnet is connected to a second end of the permanent magnet.

18. The shot peening machine of claim 17, wherein the magnetic unit further comprises:

a control unit connected to any of the first and second electromagnets in order to regulate magnetic fields of the first and second electromagnets.

19. The shot peening machine of claim 17, wherein:

the at least one core set comprises a first core set and a second core set that are spaced apart, the first core set and a second core set being operable to work together.

20. A method of regulating flow of a ferromagnetic medium, the method comprising:

providing a magnetic field at a passage by at least one core set arranged between a first end and a second end of the passage, the at least one core set comprises at least one magnetic unit enclosed inside a housing of the at least one core set, the at least one magnetic unit comprises:

a permanent magnet;

a first electromagnet, a core of the first electromagnet is connected to a first end of the permanent magnet; and a second electromagnet, and a core of the second electromagnet is connected to a second end of the permanent magnet;

wherein providing the magnetic field at the passage comprises:

generating the magnetic field at the passage by the at least one magnetic unit;

arresting the ferromagnetic medium by the magnetic field;

transferring the ferromagnetic medium from the first end of the passage to the second end of the passage; and controlling the flow of ferromagnetic medium between the first end and the second end of the passage based on the magnetic field by regulating the magnetic field of the first electromagnet and the second electromagnet.

21. The method of claim 20, further comprising:

detecting magnetic field strength of the magnetic field by a magnetometer.

22. The method of claim 20, further comprising: measuring, by a mass flowmeter, a flow rate of ferromagnetic medium.

* * * * *